United States Patent [19]

Yoneda et al.

[11] Patent Number: 5,555,347
[45] Date of Patent: Sep. 10, 1996

[54] METHOD AND APPARATUS FOR CONTROLLING A ROBOT USING A NEURAL NETWORK

[75] Inventors: Takao Yoneda, Nagoya; Katsuhiro Komura, Takahama, both of Japan

[73] Assignee: Toyoda Koki Kabushiki Kaisha, Kariya, Japan

[21] Appl. No.: 123,997

[22] Filed: Sep. 21, 1993

[30] Foreign Application Priority Data

Sep. 21, 1992 [JP] Japan .................. 4-276679
Sep. 21, 1992 [JP] Japan .................. 4-276680
Sep. 29, 1992 [JP] Japan .................. 4-285268
Sep. 29, 1992 [JP] Japan .................. 4-285269

[51] Int. Cl.$^6$ .................. G06F 15/18; G06F 15/00
[52] U.S. Cl. .................. 395/82; 395/22; 395/901; 395/903
[58] Field of Search .................. 395/82, 22, 901, 395/903

[56] References Cited

U.S. PATENT DOCUMENTS

| 4,990,838 | 2/1991 | Kawato et al. | 395/22 |
| 5,136,687 | 8/1992 | Edelman et al. | 395/22 |
| 5,371,834 | 12/1994 | Tawel | 395/23 |

FOREIGN PATENT DOCUMENTS

| 1-183703 | 7/1989 | Japan . |
| 1-173202 | 7/1989 | Japan . |
| 1-183704 | 7/1989 | Japan . |
| 2-53582 | 2/1990 | Japan . |
| 4-321104 | 11/1992 | Japan . |
| 4-336303 | 11/1992 | Japan . |

OTHER PUBLICATIONS

Guo et al, "A Solution to the Inverse Kinematic Problem In Robotics Using Neural Network processing", IEEE Neural Networks Inter. Conf. 1989.

Lee et al, "Robot Kinematic Control Based on Bidirectional Mapping Neural Network", IEEE Neural Network Inter. Conf. 1990.

Proceedings of the 32nd Midwest Symposium On Circuits And Systems, Aug. 14–16, 1989, pp. 760–762, F. Pourboghrat, "Neural Networks For Learning Inverse–Kinematics of Redundant Manipulators".

Proceedings of the 1989 International Conference On Robotics And Automation, vol. 3, May 15–19, 1989, pp. 1448–1453, V. C. Chen, et al., "Learning Control With Neural Networks".

Proceedings of the 1989 International Conference On Robotics And Automation, vol. 3, May 15–19, 1989, pp. 1441–1447, D. Yeung, et al., "Using A Context–Sensitive Learning Network For Robot Arm Control".

IEEE International Conference on Neural Networks, vol. 1, Jul. 24–27, 1988, pp. 587–594, R. K. Elsley, "A Learning Architecture For Control Based On Back–Propagation Neural Networks".

1991 IEEE International Joint Conference On Neural Networks, vol. 2, Nov. 18–21, 1991, pp. 1699–1704, C. Yee, et al., "Neural Network For The Forward Kinematics Problem in Parallel Manipulator".

IEEE International Conference On Neural Networks, vol. 1, Jul. 24–27, 1988, pp. 625–631, G. Josin, et al., "Robot Control Using Neural Networks".

(List continued on next page.)

*Primary Examiner*—George B. Davis
*Attorney, Agent, or Firm*—Oblon, Spivak, McClelland, Maier & Neustadt, P.C.

[57] ABSTRACT

A robot controller for an articulated robot, in which a joint angle vector indicating target joint angles of respective joints of the robot is calculated based on a target position matrix indicating a desired target position, and the robot is controlled ill accordance with the joint angle vector. The robot controller is further provided with a neural network for compensating the target position so as to reduce the positioning error. The learning operation of the neural network is repeatedly carried out at predetermined intervals during the operation of the robot. The target position may be preliminarily compensated using a mathematical model.

6 Claims, 24 Drawing Sheets

OTHER PUBLICATIONS

Proceedings of the 1990 IEEE International Workshop On Intelligent Robots and Sytems: Towards A New Frontier Of Applications, vol. 1, Jul. 3–6, 1990, pp. 635–640, N. Takanashi, "6 D.O.F. Manipulators Absolute Positioning Accuracy Improvement Using a Neural–Network".

1991 IEEE International Joint Conference On Neural Networks, vol. 3, Nov. 18–21, 1991, pp. 2001–2006, C. Kozakiewicz, et al., "Partitioned Neural Network Architecture For Inverse Kinematic Calculation of A 6 DOF Robot Manipulator".

Proceedings of the 1990 IEEE International Workshop on Intelligent Robots and Systems: Towards A New Frontier of Applications, vol. 1, Jul. 3–9, 1990, pp. 213–220, C. Kozakiewicz, et al., "Calibration Analysis of a Direct Drive Robot".

IEEE International Conference On Neural Networks, Jul. 24–28, 1988, vol. 1, 1988, pp. 617–624, G. Allon, et al., "Solution to The Inverse Kinematics Problem in Robotics By Neural Networks".

International Journal of Robotics Research, vol. 16, No. 4, 1987, pp. 47–60, H. O. K. Kirchner, et al., "A Perturbation Approach to Robot Calibration".

FIG. 11

| NO. | INPUT DATA | TEACHING DATA |
|---|---|---|
| 1 | D1 | E1 |
| 2 | D2 | E2 |
| 3 | D3 | E3 |
| ⋮ | ⋮ | ⋮ |
| n | Dn | En |

METHOD AND APPARATUS FOR CONTROLLING A ROBOT USING A NEURAL NETWORK

BACKGROUND OF THE INVENTION

1. Field of the Invention

This invention relates to a method and an apparatus for controlling a robot, and more particularly to a method and an apparatus for controlling a robot in which positional compensation is performed by the use of a neural network.

2. Discussion of Related Art

In industrial robots, positional errors are produced due to dimensional errors of their arms which are caused by machining error, assembly error, thermal deformation and the like, and bend of each arm which is caused by its weight, and other factors. In a conventional controller for an industrial robot, a positional matrix Mm is initially obtained which indicates a target position of the end effecter of the robot, and the positional matrix is then subjected to reverse conversion using a reverse conversion function fa, in which the above-mentioned errors are taken into consideration, so as to obtain a joint angle vector Aa indicating target angular positions of the respective joints of the robot. The joints are moved in accordance with the joint angle vector Aa so as to position the end effecter of the robot to the target position.

As described above, the joint angle vector Aa is obtained by reverse conversion of the target position matrix Mm with the reverse conversion function in which the above-mentioned errors are compensated for. However, if the reverse conversion or coordinate conversion is carried out with taking all of the causes of the errors into consideration, the processing of the coordinate conversion becomes extremely difficult. Further, the amount of calculation becomes large because of the complicated mathematical analysis. Accordingly, in the conventional robot controller, compensation is carried out with only limited numbers or causes of errors being taken into consideration. Therefore, the positioning accuracy of the conventional robots is insufficient. This will be further explained. Formula (1) shows a relationship between a target position and an actual position of the end effecter of a robot.

$$Mm \xrightarrow{fa} Aa \xrightarrow{gt} Ma \qquad (1)$$

wherein

Mm: target position matrix;

fa: reverse conversion function in which limited number of errors are taken into consideration;

Aa: joint angle vector as a control target;

gt: actual forward conversion function indicating mechanical conversion in which all the errors are reflected;

Ma: position matrix indicating an actual position of the end effecter of the robot which has been moved in accordance with Aa.

In such a robot controller, a positioning error dMe can be expressed as dMe=Ma−Mm.

As is understood from the formula (1), the joint angle vector Aa is obtained by reversely converting the target position matrix Mm using the reverse conversion function fa, in which only limited number of causes of errors are taken into consideration. Accordingly, the position matrix Ma indicating the actual position of the end effecter of the robot does not coincide with the target position matrix Mm, and an positioning error dMe is produced due to errors which have not been taken into consideration.

Further, the above-mentioned positioning error increases and changes as the time elapses. To eliminate positioning error, it is required to measure the positioning error at predetermined intervals and to compensate the target position according to the measured error. This is time consuming and troublesome.

In the meantime, a controller having all off-line teaching apparatus shown in FIG. 1 has been proposed. In the off-line teaching system 700, a target position Mm is initially generated at a section 701 which is then held at a memory section 702. In a section 703, the target position Mm is compensated for errors with the use of a mathematical model, in which errors such as error in lengths of arms of a robot 710, angular position error caused during assembly of the arms, and the like are taken into consideration so as to obtain a compensated target position Mm. The compensated target position Mm is written into a data storage such as a floppy disc at a section 704. When an operator wants to operate the robot 710, the operator inserts the floppy disc into a floppy drive (not shown) of the robot controller 750. A control section 752 of the robot controller 750 reads out the compensated target position Mm' from the floppy disc via a temporary memory section 751 so as to control the movement of the robot 710.

Even when it is tried to carry out compensation of the target position Mm with the use of the mathematical model in which various causes of errors are taken into consideration, satisfactory result cannot be obtained, because the causes of positioning errors are manifold and are difficult to be completely expressed in the mathematical model. Therefore, accurate compensation cannot be carried out.

SUMMARY OF THE INVENTION

An object of the present invention is to provide a method and an apparatus for controlling a robot, which is capable of compensating for errors which cannot be taken into consideration in conventional robot controllers.

Another object of the present invention is to provide a method and an apparatus for controlling a robot, in which learning procedure of a neural network is automatically carried out.

Still another object of the present invention is to provide an improved apparatus which is capable of accurately compensating target positions, and is capable of eliminating the necessity of compensation on teaching data at a working site at which a robot is actually used.

Briefly, the present invention provides a method and an apparatus for controlling a robot in which a neural network is used for compensating a target position matrix indicating a target position of an end effecter of the robot. A first joint angle vector indicating target joint angles of respective joints of the robot is first obtained based on the target position matrix. The first joint angle vector is input to the neural network to obtain a compensation amount corresponding to the target position matrix. The target position matrix is compensated with the compensation amount so as to obtain a compensated target position matrix. A second joint angle vector indicating target joint angles of the respective joints of the robot is then calculated based on said compensated target position matrix, and the robot is controlled in accordance with the second joint angle vector.

As described above, according to the present invention, errors which cannot be taken into consideration in conventional robot controllers are also compensated for by the neural network. Therefore, the accuracy of the compensation can be increased.

Further, in the present invention, a joint angle vector is calculated from each target position matrix, and the joint angle vector thus obtained is given to the neural network in order to obtain a compensation matrix corresponding to the joint angle vector. Therefore, the leaning procedure of the neural network is simple compared to the conventional method in which a compensation matrix is calculated directly from each target position.

Moreover, since a compensation matrix is obtained based on a joint angle vector, the number of causes of errors can be reduced.

According to another aspect of the present invention, leaning procedure of the neural network is automatically carried out at predetermined time intervals during the operation of the robot. Therefore, it becomes possible to eliminate the production of errors which increase as the robot ages.

According to a further aspect of the present invention, there is provided a robot controller having an off-line teaching apparatus. In the teaching apparatus, the target position is compensated with a mathematical model to obtain a preliminarily compensated target position. In the robot controller, the preliminarily compensated target position is again compensated by a neural network. The positioning accuracy is therefore increased. Further, since the positioning accuracy is increased, it becomes possible to eliminate the necessity of compensating teaching data at a working cite at which the robot is actually used. This reduces the installation cost of the robot, and increases the safety.

In an embodiment, the compensation with the neural network is carried out in an off-line teaching apparatus. Accordingly, a sophisticated learning procedure of the neural network can be carried out quickly, because the processing capability of the processor in the off-line teaching apparatus is generally higher than that of the processor in the robot controller.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 11 is a chart showing the structure or data base which includes input data and teaching data both used for learning procedure of the neural network;

DETAILED DESCRIPTION OF PREFERRED EMBODIMENTS

Figure 1:
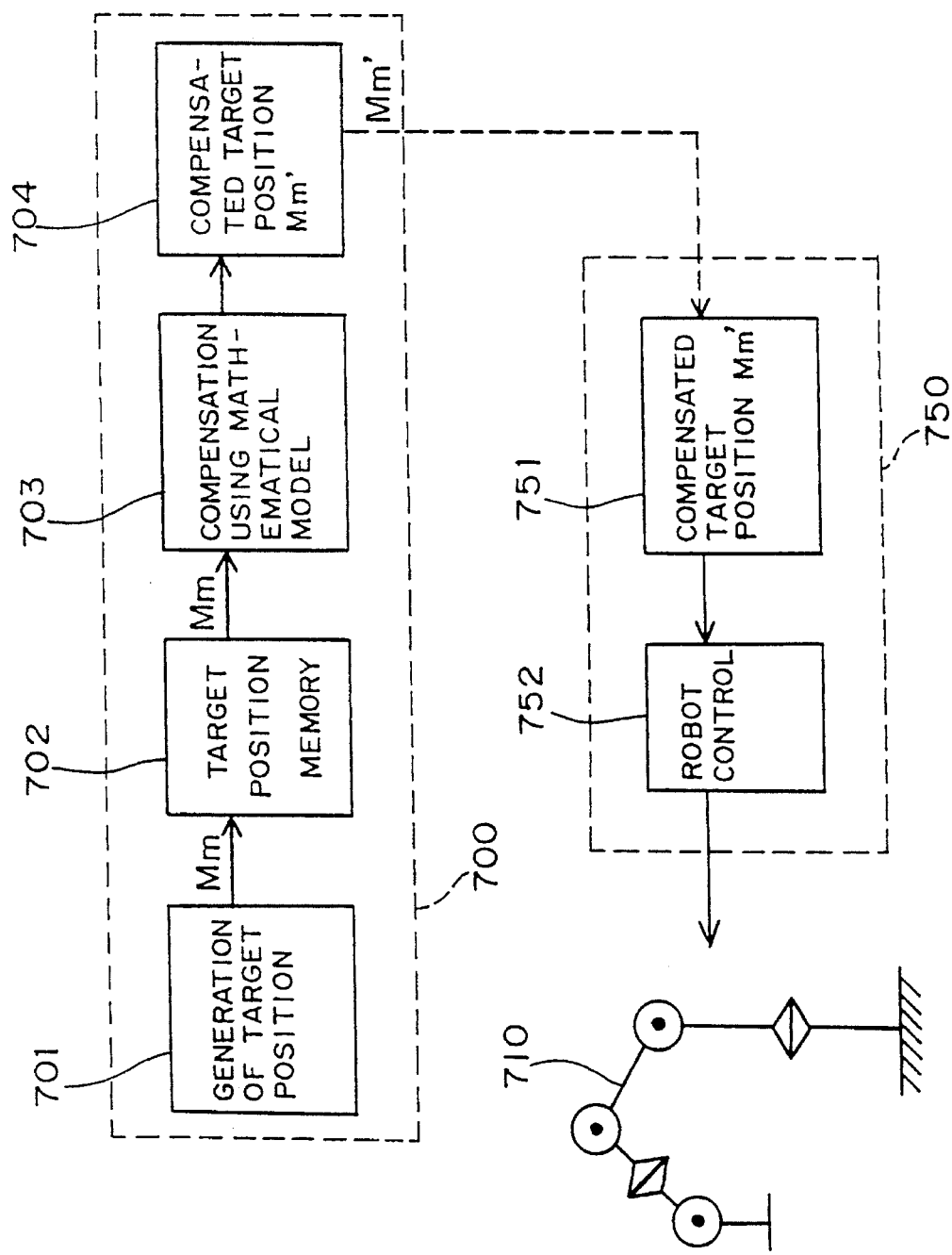
FIG. 1 is a block diagram showing a conventional robot control system.
Figure 2:
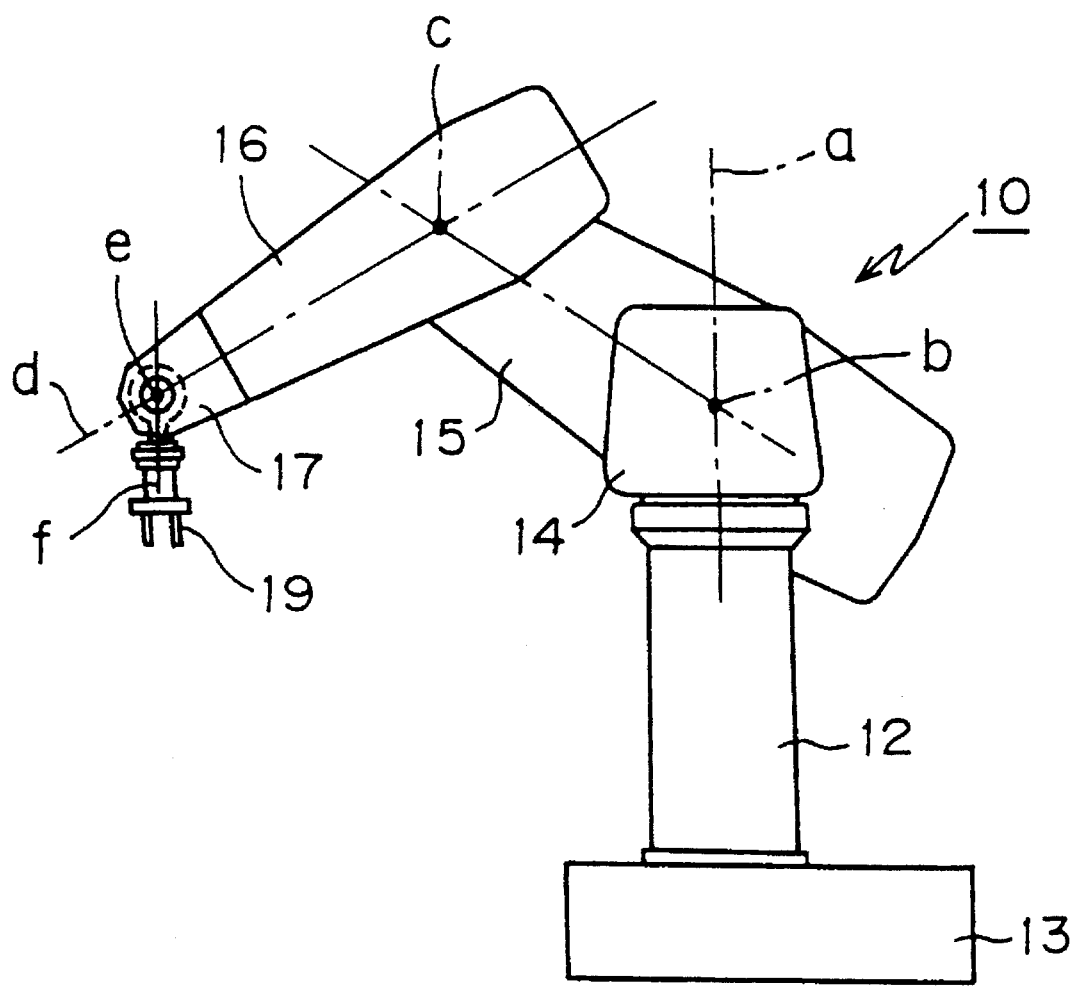
FIG. 2 is a view showing the structure of a robot used in a first embodiment of the present invention.

Preferred embodiments of the present invention will now be described with reference to the drawings.
First Embodiment:
A: Mechanical Structure of Robot Initially, the structure of a robot 10 having six joints which is used in a first embodiment of the present invention will be explained with reference to FIG. 2.

The robot 10 is composed of a column 12 mounted on a base 13, a shoulder 14, a first arm 15, second arm 16, a wrist portion 17 and a finger portion (end effecter) 19. The position and posture of the finger portion 19 is controlled in six-axis freedom which is realized by a first joint a, a second joint b, a third joint c, a fourth joint d, a fifth joint e and a sixth joint f.
B: Structure of Robot Controller Next, the structure of a robot controller for controlling the robot 10 will be explained with reference to FIG. 3.

Connected to a CPU 11 which carries out calculation and control for the robot 10 are an operating box 27 and an operation panel 26, both of which are used for inputting control commands, an external storage device 29 for storing control date, a ROM 20, and a RAM 30. A first-axis servo control circuit 40a though a sixth-axis servo control circuit 40f, which control the movements of the six axis a—f, are also connected to the CPU 11. In response to input signals from outside devices such as the operation panel 26, the CPU 11 outputs command signals to the servo control circuits 40a–40f. Responding to the command signals, the servo control circuits 40a–40f drive servomotors M1 through M6, respectively, so as to control the angular movements of the first through sixth joints a–f. With this operation, the position and posture of the finger portion 19 is controlled. The rotations of the servomotors M1-M6 are detected by encoders E1–E6, respectively, and are fed back to the corresponding servo control circuits. A condition measurement device 52 is also connected to the CPU 11 for measuring physical conditions of the robot which cause positioning error, such as temperature of the robot 10 and load acting on the robot 10. The load can be measured by measuring the current flowing through each of the servomotors M1-M6.

C: Operation of Robot Controller

Before the detailed explanation of control by the robot controller, the theory of compensation will be explained.

As mentioned in the section of Related Art, conventional robots are controlled in the following manner. The positional matrix Mm of a target position is first obtained, and the position matrix Mm is converted with a reverse conversion function fa to a joint angle vector Aa, which is used as target angular positions of the respective joints. The robot is controlled based on the joint angle vector Aa. The position matrix Ma, which indicates the actual position of the finger portion of the robot after the finger portion of the robot has been moved in accordance with the joint angle vector Aa, can be obtained by forwardly converting the joint angle vector Aa with an actual forward conversion function gt, which is determined based on the actual relationship between the angles of the respective joints and the position of the finger portion of the robot and in which all the errors are reflected.

$$Mm \xrightarrow{fa} Aa \xrightarrow{gt} Ma \qquad (1)$$

wherein

Mm: target position matrix;

fa: reverse conversion function in which limited number of errors are taken into consideration;

Aa: joint angle vector as a control target;

gt: actual forward conversion function in which all the errors are reflected;

Ma: position matrix indicting an actual position of the finger portion of the robot which has been moved in accordance with Aa.

In robot controllers according to the conventional art, the robot is controlled in accordance with the joint angle vector Aa which has been calculated with the reverse conversion function fa in which only limited number of causes of errors are taken into consideration. The position matrix Ma indicating the actual position of the finger portion of the robot includes errors which are not taken into consideration. This produces control errors or positional errors. In detail, the forward conversion function gt includes some errors, which are not taken into consideration during the reverse conversion. Therefore, a difference exists between the reverse conversion using the reverse conversion function fa and the forward conversion using the forward conversion function gt. This difference produces positional errors.

In the present invention, the target position matrix Mm indicating a target position is compensated with a compensation matrix dMm indicating an amount of compensation, so that the position matrix Ma indicating the actual position of the finger portion of the robot is made to coincide with the target position matrix Mm. The robot is controlled in accordance with the compensated target position matrix Mm. The compensation will be explained in further detail.

First, a presumption is made that an error between the reverse conversion using the reverse conversion function fa and forward conversion using the forward conversion function gt corresponds to an amount of compensation to be carried out. When the error between the reverse conversion using the reverse conversion function fa and forward conversion using the forward conversion function gt is indicated as dMm, the formula (1) can be modified as follows:

$$Mm \cdot dMm = Ma \qquad (2)$$

From the formula (2), a compensation matrix dMm indicating the amount of error to be compensated for is calculated as follows:

$$dMm = Mm^{-1} \cdot Ma \qquad (3)$$

Here, the reverse matrix $dMm^{-1}$ of the compensation matrix dMm is considered as a compensation amount. When a compensated target position matrix Mm' is obtained by multiplying the target position matrix Mm by the reverse matrix $dMm^{-1}$, and the compensated target position matrix Mm' thus obtained is substituted to the formula (1), the following equation can be obtained:

$$Mm' \xrightarrow{fa} Aa' \xrightarrow{gt} Ma' \qquad (4)$$

wherein

Mm': target position matrix compensated by multiplying the target position matrix Mm by the reverse matrix;

Aa': joint angle vector as a control target which is obtained based on the compensated target position matrix Mm;

Ma': position matrix indicating an actual position of the finger portion of the robot which has been moved in accordance with the joint angle vector Aa'.

As described above, the compensated target position matrix Mm' is obtained by the formula of $Mm'=Mm \cdot dMm^{-1}$. Therefore, it can be considered that the formula (4) is closely resemble to the following formula:

$$Mm \cdot dMm^{-1}]dMm \approx Ma' \qquad (5)$$

Accordingly, the following formula is finally obtained:

$$mm \approx Ma' \qquad (6)$$

As is clearly understood from the formula (6), the position matrix Ma' indicating the position of the finger portion of the robot becomes substantially equal to the target position defined by the matrix Mm, if the joint angle vector Aa', which is used as target in the control of the robot, is calculated based on the compensated target position matrix Mm which has been compensated by multiplying the target position matrix Mm by the reverse matrix $dMm^{-1}$ indicating a compensation amount. In the robot controller according to the present embodiment, compensation is carried out in the above-mentioned manner with the aid of a neural network.

Figure 4:
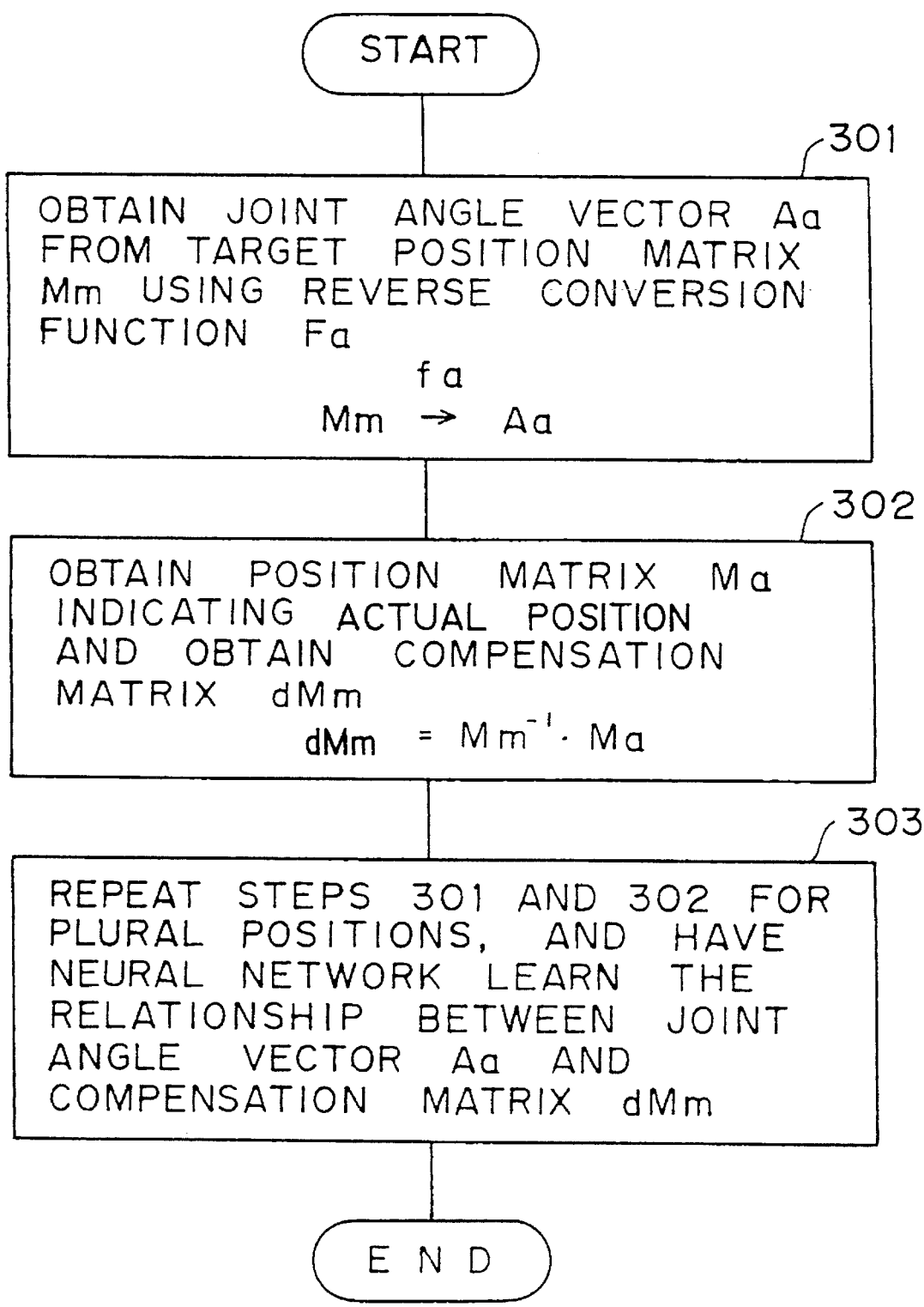
FIG. 4 is a flowchart showing the operation of the robot controller according to the first embodiment at the time of learning.
Figure 5:
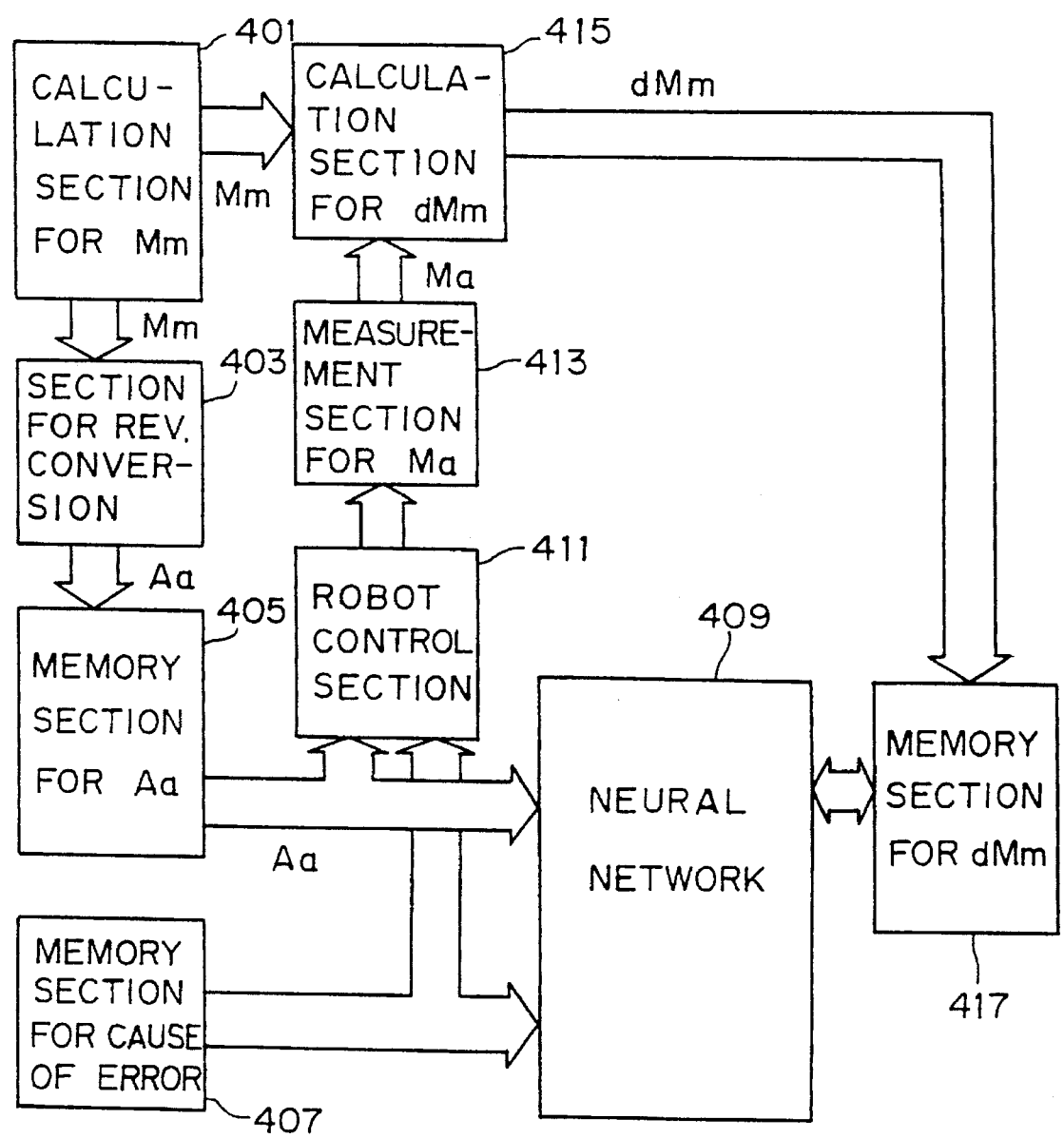
FIG. 5 is a block diagram showing the operation of the robot controller according to the first embodiment at the time of learning.

1. Leaning Operation:

Operation of the robot controller for carrying out learning procedure of the neural network will be described with reference to the flowchart shown in FIG. 4 and the block diagram shown in FIG. 5.

In a calculation section 401, a position matrix Mm indicating a target position of finger section 19 is calculated. In a calculation section 403, a joint angle vector Aa corresponding to the target position matrix Mm is calculated with the use of a reverse conversion function fa in which load and temperature are taken into consideration as the causes of errors (step 301 in FIG. 4).

Next, the joint angle vector Aa is then stored in a memory section 405, while data regarding load and temperature are stored in a memory section 407. In a control section 411, the robot 10 is controlled in accordance with the joint angle vector Aa. After that, the actual position of the finger portion 19 is measured in a measurement section 413, in order to calculate a position matrix Ma indicating the actual position of the finger portion 19 after the positioning operation. In a calculation section 415, a reverse matrix of the target position matrix Mm is calculated, and a compensation matrix dMm is then calculated by the formula (3) based on the reverse matrix and the position matrix Ma indicating the actual position of the finger portion of the robot (step 302). The compensation matrix dMm thus obtained is stored in a memory section 417.

The processing at steps 301 and 302 are repeated to accumulate plural joint angle vectors Aa and compensation matrix dMm for plural target positions. The accumulated joint angle vectors Aa and date regarding the causes of errors are input to a neural network 409, as input data, while the compensation matrix dMm is input to the neural network 409, as teaching data. The neural network 409 learns the relationship between the joint angle vector Aa and the corresponding compensation matrix dMm (step 303). The learning operation of the neural network 409 in step 303 will be explained hereinafter in further detail.

The calculation sections 401, 403 and 415, the memory sections 405, 407 and 417, the neural network 409, the measuring section 413 and the control section 411 are realized by software and hardware.

Figure 6:
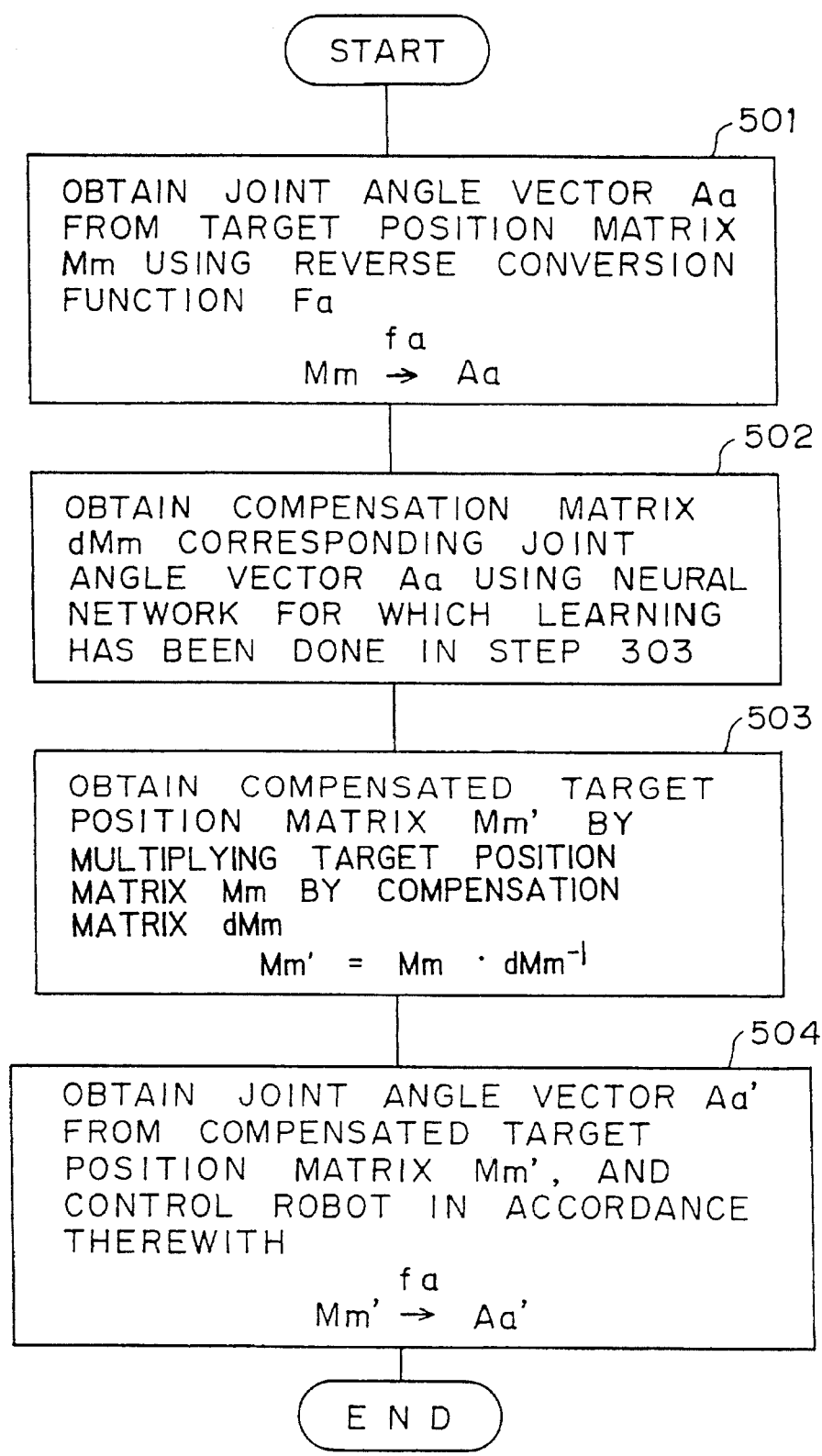
FIG. 6 is a flowchart showing the operation of the robot controller according to the first embodiment after the learning.
Figure 7:
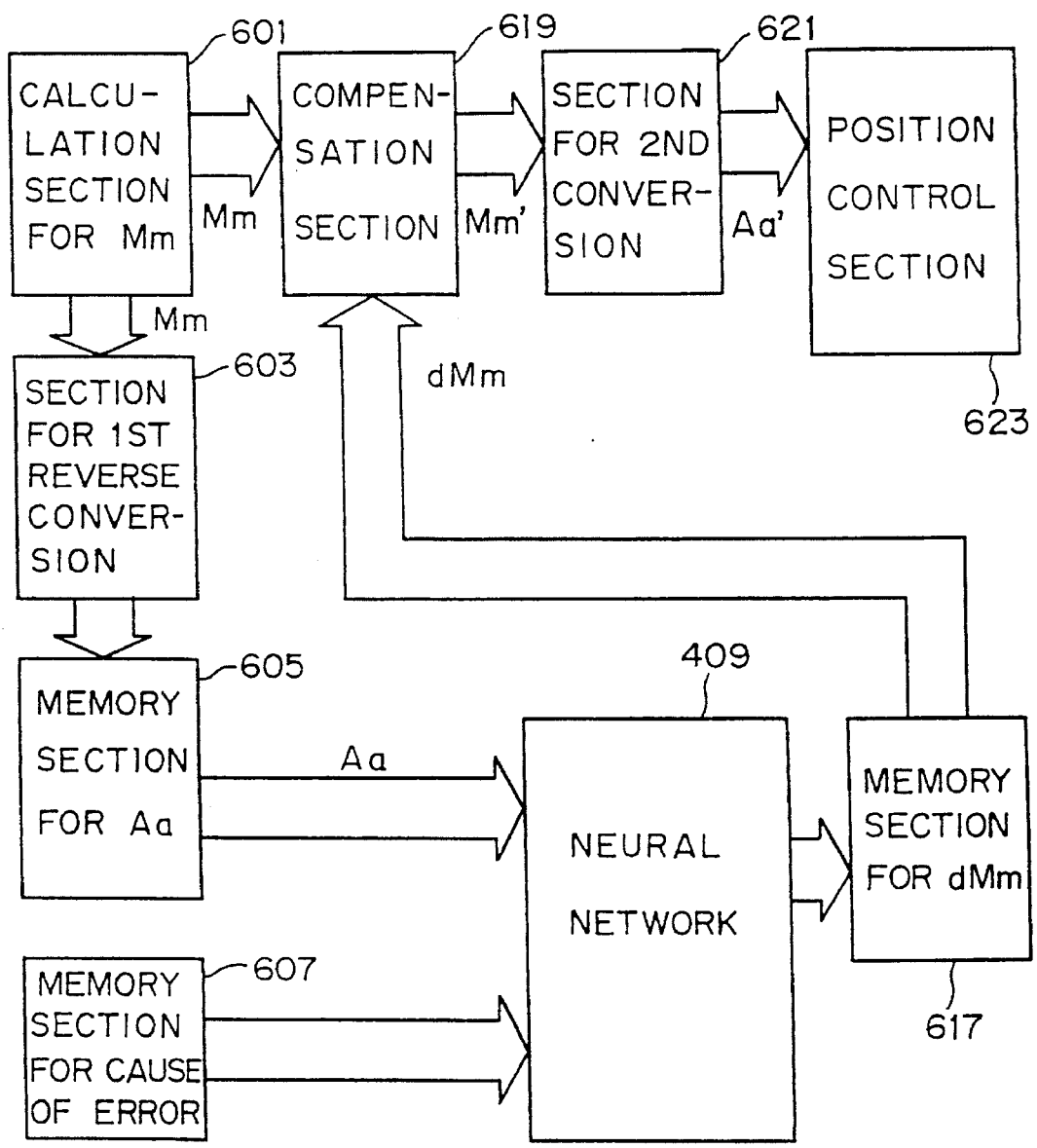
FIG. 7 is a block diagram showing the operation of the robot controller according to the first embodiment after the learning.

2. Ordinary Operation:

Next, the operation of the robot controller after the completion of the learning operation of the neural network 409 will be explained with reference to the flowchart shown in FIG. 6 and the block diagram shown in FIG. 7.

In a calculation section 601, a position matrix Mm indicating a target position of the finger section 19 is calculated. In a calculation section 603, a joint angle vector Aa corresponding to the target position matrix Mm is calculated with the use of a reverse conversion function fa in which load and temperature are taken into consideration as the cause of errors (step 501 in FIG. 6).

Next, the joint angle vector Aa is then stored in a memory section 605, while data regarding load and temperature, which cause positional errors of the robot 10, are stored in a memory section 607. The joint angle vectors Aa and date regarding physical values which are the causes of errors are input to the neural network 409 so as to obtain a compensation matrix dMm corresponding to the joint angle vector and the physical values. The compensation matrix dMm thus obtained is stored in a memory section 617 (step 502).

In a compensation section 619, a reverse matrix dMm$^{-1}$ of the compensation matrix dMm stored in the memory section 617 is obtained. After that, a compensated target position matrix Mm' is obtained by the following formula (step 503):

$$Mm'=Mm \cdot dMm^{-1}.$$

Finally, in a calculation section 621, a joint angle vector Aa' indicating target angles of the first through sixth joints a–f of the robot 10 is calculated based on the compensated target position matrix Mm by using the reverse conversion function fa. A position control section 623 outputs command signals to the servo control circuits 40a–40f in accordance with the obtained joint angle vector Aa'. In response to the command signals, the servo control circuits 40a–40f drive the servomotors M1 through M6 so as to control the position and posture of the finger portion 19 of the robot 10 (504).

The calculation sections 601, 603 and 621, the memory sections 605, 607 and 617, compensation section 619, and position control section 623 are realized by software and hardware.

In the above-embodiment, a joint angle vector Aa is obtained from a target position matrix Mm, and the joint angle vector Aa thus obtained is given to the neural network 409 so as to obtain compensation amounts (compensation matrix dMm) corresponding to the target position matrix Mm. Therefore, the learning operation of the neural network 409 is easily carried out compared to another method in which a compensation matrix is obtained from each target position matrix.

Further, in the above-mentioned embodiment, a joint angle vector Aa is given to the neural network 409 to obtain a corresponding compensation matrix dMm. This reduces the number of causes of errors. If each target position matrix is given directly to the neural network 409, error would be produced, because of the presence of plural joint angle vectors for every target position matrix.

D. Neural Network

The structure and operation of the neural network 409 win now be explained in further detail.

1. Structure of Neural network

The neural network 409 is constituted by the CPU 11, ROM 20 and RAM 30. The ROM 20 has a control program area 21 in which a control program is stored, a neural network area 22 in which a calculation program of the neural network is stored, and a learning program area 23 in which a program for carrying out the learning operation of the neural network is stored. The RAM 30 has an input data memory area 31 for storing, as input data, the joint angle vector Aa stored in the memory section 405, which has been explained with reference to FIG. 5, and data regarding the causes of errors such as temperature and load which are stored in the memory section 407. The RAM 30 also has a teaching data memory means 32 for storing the compensation matrix dMm as teaching data, which is stored in the memory section 417, and a coupling coefficient memory area 33 for storing coupling coefficients of the neural network 409.

Figure 8:
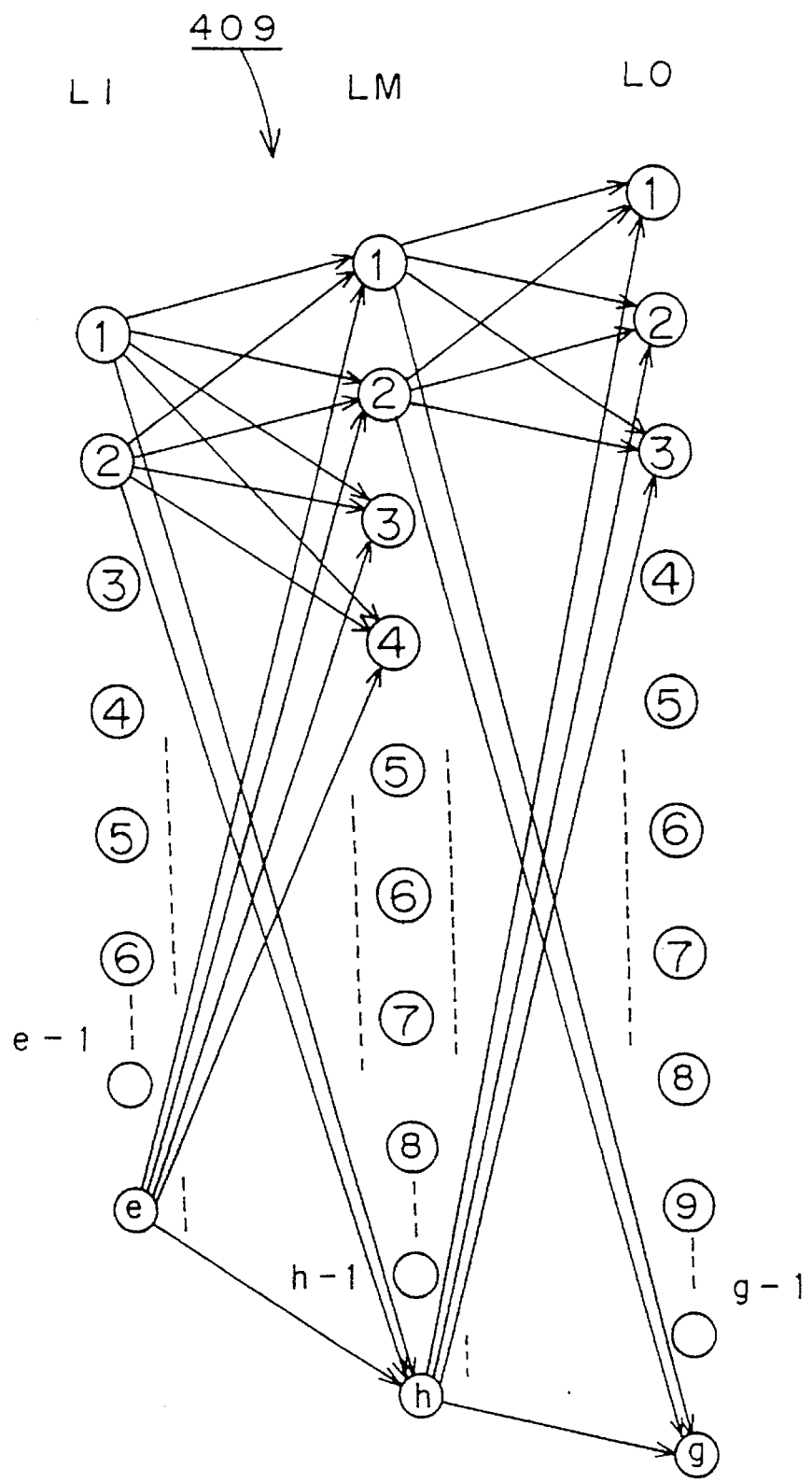
FIG. 8 is a chart showing the structure of a neural network of the robot controller according to the first embodiment.

The neural network 409 of the present embodiment is composed of an input layer LI, an output layer LO and an intermediate layer LM, as shown in FIG. 8.

The input layer LI has input elements whose number is e, and the output layer LO has output elements whose number is g, while the intermediate layer LM has output elements whose number is h.

A neural network having a multiple-layer structure is generally defined as a device carrying out the following calculation.

The output $O^i_j$ of the j-th element in the i-th layer is calculated by the following formula, wherein i is an integral number of 2 or more:

$$O^i_j = f(I^i_j) \tag{7}$$

$$I_j^i = \sum_k W_{k,ij}^{i-1} \cdot O_k^{i-1} + V_j^i \tag{8}$$

$$f(x) = 1/\{1 + exp(-x)\} \tag{9}$$

In the above formulae, $V_j^i$ is a bias for the j-th calculation element in the i-th layer, $W_{k,j}^{i-1,i}$ is a coupling coefficient between the k-th element in the i-th layer and the j-th element in the i-th layer, and $O_j^1$ is an output value of the j-th element in the first layer. In the first layer, the input data is outputted as it is without calculation. The output value of the j-th element in the first layer (input layer) is equal to the input value of the j-th element in the first layer.

Figure 9:
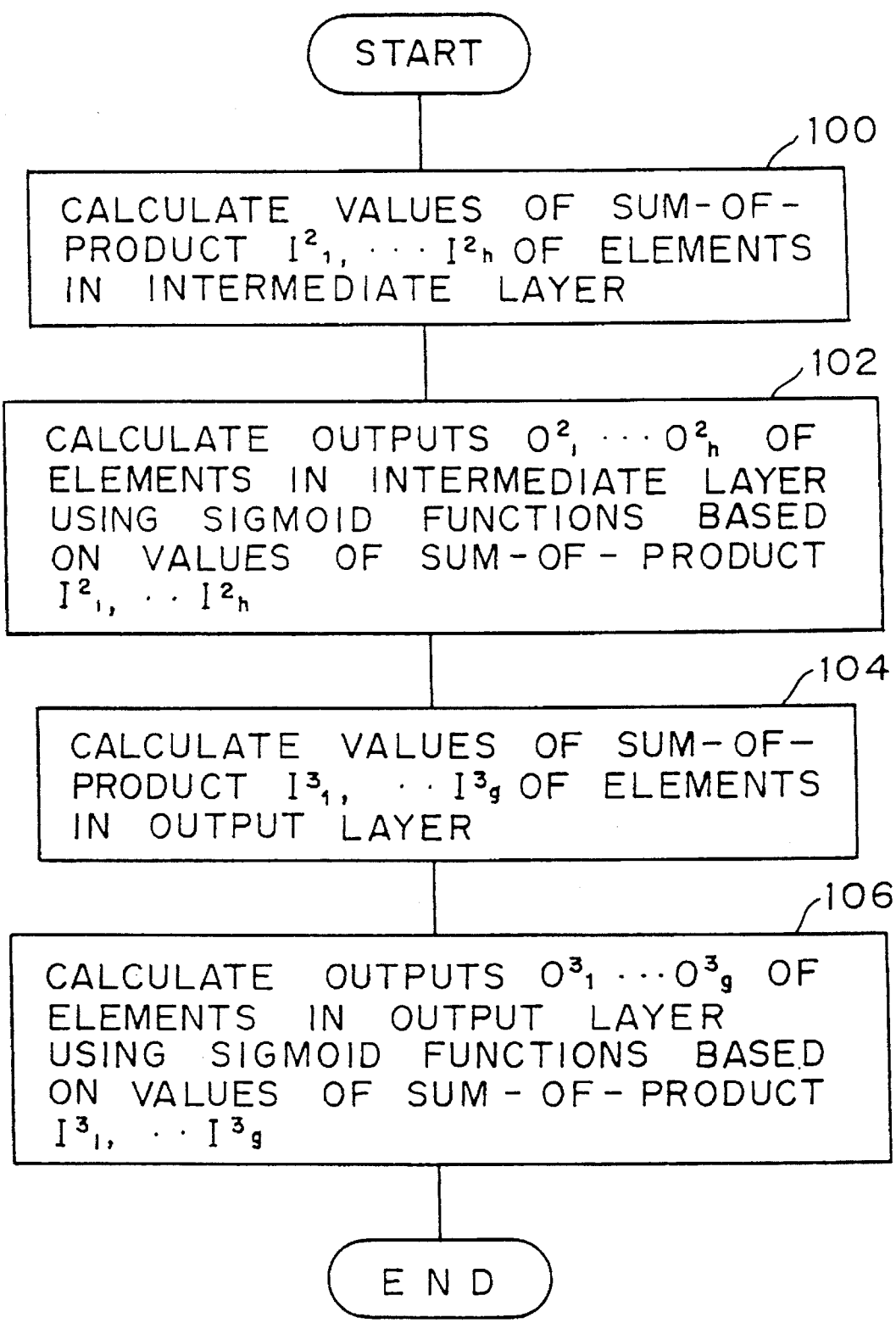
FIG. 9 is a flowchart showing a calculation procedure of the neural network shown in FIG. 8.

Next, the calculation procedure of the neural network 409 win be explained in more detail with reference to FIG. 9. The calculation for every layer is carried out by executing a program stored in the neural network area 22 of the ROM 20 with reference to coupling coefficients memorized in the coupling coefficient memory area 33 of the RAM 30.

In step 100 the output value $O_j^1$ of every element in the input layer (first layer) is input to the j-th element in the intermediate layer (second layer), and the following calculation of sum-of-product is carried out using the layer numbers and the number of the elements in the first layer.

$$I_j^2 = \sum_{k=1}^{e} W_{k,j}^1 \cdot O_k^1 + V_j^2 \tag{10}$$

In next step 102, an output of each element in the intermediate layer (second layer) is calculated in accordance with the following equation using a sigmoid function based on the value obtained by the calculation of sum-of-product (10). The output of the j-th element in the second layer is expressed as follows:

$$O_j^2 = f(I_{2j}) = 1/\{1 + exp(-I_j^2)\} \tag{11}$$

The output value $O_j^2$ is used as an input value for each element in the output layer (third layer).

In next step 104, the calculation of sum-of-product is carried out for each element in the output layer (third layer).

$$I_j^3 = \sum_{k=1}^{h} W_{k,j}^2 \cdot O_k^2 + V_j^3 \tag{12}$$

In next step 106, an output of each element in the output layer is calculated in accordance with the following equation using a sigmoid function:

$$O_j^3 = f(I_j^3) = 1/\{1 + exp(-I_j^3)\} \tag{13}$$

2. Structure of input data and teaching data

Data used for leaning of the neural network has a structure as shown in FIG. 11.

D1 through Dn indicate n sets of input data, while E1 through En indicate n sets of teaching data. The n sets of input data are obtained in steps 301, 302 and 303, and include joint angle vectors Aa stored in the memory section 405 and data regarding temperature, load and the like stored in the memory section 407. The n sets of teaching data are compensation matrixes dMm stored in the memory section 417. These data are respectively stored in the input data area 31 and the teaching data area 32 of the RAM 30.

The input data are defined as follows. Each set of data is composed of e pieces of data given to e pieces of input elements. The m-th set of data is referred to as Dm, and a piece of data given to the j-th element belonging thereto is referred to as $d_{mj}$. In other word, Dm is a vector while $d_{mj}$ is a component thereof. Namely, Dm is defined as follows:

$$Dm = (d_{m1}, d_{m2}, \ldots d_{me-1}, d_{me}) \tag{14}$$

Also, the n sets of data are indicated as D1, D2, ... Dn-1, Dn, while they are called as an input data group D as a whole.

When the input data Dm is applied to the formula (10), the component dmk is substituted to the $O_k^1$ of the formula (10).

Similarly, E1 through En are defined as follows. Each set of data is composed of g pieces of data output from g pieces of output elements of the output layer LO. The m-th set of teaching data is referred to as Em, and a piece of teaching data which corresponds to the j-th output element and belongs to the teaching data Em is referred to as $e_{mj}$. In other word, Em is a vector while $e_{mj}$ is a component thereof. Namely, Em is defined as follows:

$$Em = (e_{m1}, e_{m2}, \ldots e_{mg-1}, e_{me}) \tag{14}$$

Also, the n sets of data are indicated as E1, E2, ... En-1, En, while they are called as an input data group E as a whole.

3. Learning operation of neural network

Figure 10:
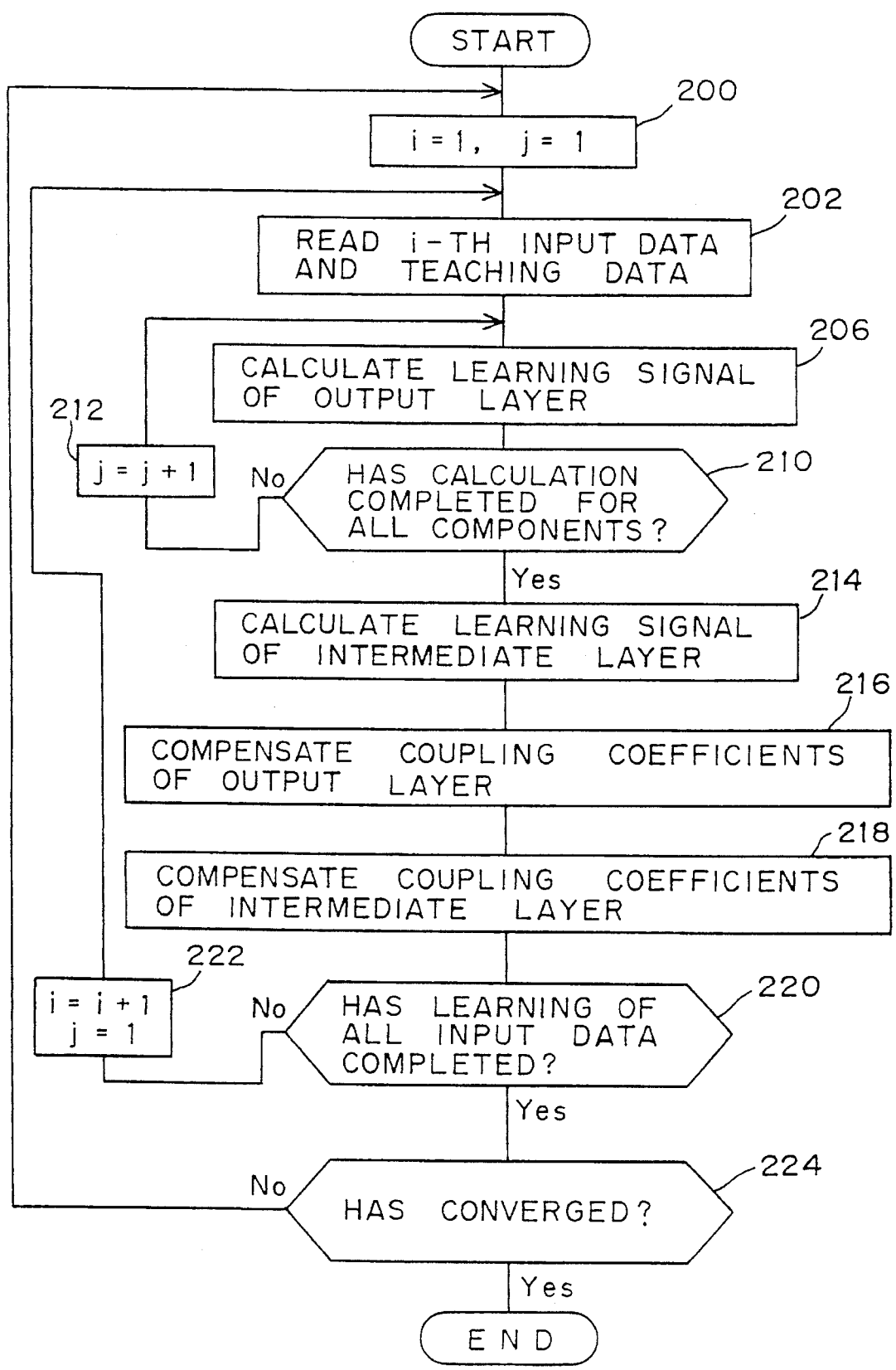
FIG. 10 is a flowchart showing a learning procedure of the neural network shown in FIG. 8.

A program which is stored in the learning program area 23 of the ROM 20 and is shown in FIG. 10 is executed so as to carry out an initial learning operation of the neural network. Learning for determining the coupling coefficients is carried out by the well known back propagation method. Plural sets of input data and plural sets of teaching data are prepared for various conditions. The learning is repeatedly carried out, so that each output data corresponding to each input data becomes equal to the corresponding teaching data. As mentioned above, these input data and teaching data are memorized in the input data memory area 31 and teaching data memory area 32, respectively.

In step 200 of the flowchart shown in FIG. 10, a data number i designating data is initially set to 1, and a number j indicating one of the output elements (one of components of each teaching data) is also initially set to 1.

After moving to step 202, i-th input data Di and i-th teaching data Ei are read out from the input data memory area 31 and teaching data memory area 32, respectively. In next step 206, a leaning signal for an output element in the output layer which corresponds to the j-th component $e_{ij}$ of the i-th teaching data Ei is calculated in accordance with the following formula:

$$Y_j^3 = (e_{ij} - O_j^3) \cdot f'(I_j^3) \tag{16}$$

wherein data number i is omitted in the terms $Y_j^3$, $O_j^3$ and $I_j^3$, and f'(X) is a derived function of the sigmoid function.

$I_j^3$ is obtained as follows. Firstly, all the components of the input data D1 is substituted to $O_k^1$ so as to obtain $I_k^2$ for all the elements in the intermediate layer. The $I_k^2$ is substituted to the formula (11) to obtain $O_k^2$ for all the element in the intermediate layer. The $O_k^2$ thus obtained is substituted to the formula (12) to obtain the $I_j^3$. $O_j^3$ can be obtained by substituting the $I_j^3$ to the formula (13).

In next step 210, it is judged that learning signals for all the output elements have been obtained. When the result of the judgment is NO, the processing moves back to step 212 via step 206 in which the element number j is incremented by one, so that a leaning signal for a next output element is calculated.

When it is judged at step 210 that learning signals for all the output elements have been obtained, the processing moves to step 214 in which a learning signal Y for the r-th element in the intermediate layer is calculated in accordance with the following formula:

$$Y_r^2 = f(I_r^2) \cdot \sum_{k=1}^{9} Y_r^3 \cdot W_{r,k}^2{}^3 \quad (17)$$

The above calculation for learning is repeated for all the elements in the intermediate layer.

In next step 216, the coupling coefficients of the output layer are compensated. The amounts of compensation are obtained as follows:

$$\Delta W^2{}_{i,j}^3(t) = P \cdot Y_j^3 \cdot f(I_j^2) + Q \cdot \Delta W^2{}_{i,j}^3(t-1) \quad (18)$$

wherein $\Delta W^2{}_{i,j}^3$ (t) is a change amount in the t-th calculation for obtaining a coupling coefficient between the j-th element in the output layer and i-th element in the intermediate layer, $\Delta W^2{}_{i,j}^3$ (t-1) is a change amount in the previous calculation for the coupling coefficient, and P and Q are proportional constants.

Accordingly, compensated coupling coefficients can be obtained as follows:

$$W^2{}_{i,j}^3 + \Delta W^2{}_{i,j}^3(t) \rightarrow W^2{}_{i,j}^3 \quad (19)$$

After moving step 218, the coupling coefficients of the intermediate layer are obtained in a manner similar to that for obtaining the coefficients of the output layer.

$$\Delta W^1{}_{i,j}^2(t) = P \cdot Y_j^2 \cdot f(I_j^1) + Q \cdot \Delta W^1{}_{i,j}^2(t-1) \quad (20)$$

Accordingly, compensated coupling coefficients can be obtained as follows:

$$W^1{}_{i,j}^2 + \Delta W^1{}_{i,j}^2(t) \rightarrow W^1{}_{i,j}^2 \quad (21)$$

In step 220, it is judged whether the above-mentioned learning procedure has completed for the n sets of input data and teaching data. When it is judged that the learning procedure has not completed for the n sets of input data and teaching data, the processing moves to step 222, in which the data number i is incremented by one and the component number j is reset to "1" for reading out a next set of input data and output data corresponding thereto from the input data memory area 31 and teaching data memory area 32. The processing then moves back to step 202 to repeat the above-mentioned learning procedure using the next set of input data and teaching data.

When it is judged in step 220 that the learning procedure has completed for the n sets of input data and output data, the processing moves to step 224, in which it is judged whether or not the squared value of a difference between the output data and teaching data decreases to be equal to or smaller than a predetermined value so as to judge whether the coupling coefficients have converged. When the coupling coefficients have not converged yet, the processing moves back to step 200 to carry out a second learning procedure in which the above-mentioned processing is started with the first set of input data and teaching data.

The above-mentioned learning procedure is repeated until it is judged at step 224 that the squared value of the difference between the output data and teaching data decreases to be equal to or less than the predetermined value, in other word, until the coupling coefficients have converged. As a result, the initial learning procedure of the neural network 409 has completed for variety of initial conditions. After the completion of the initial learning procedure, the neural network 409 calculates and outputs a proper compensation matrix dMm based on a joint angle vector Aa given to the neural network 409, as shown in FIG. 7.

In the above-mentioned embodiment, errors in the position and posture of the finger portion is compensated for. The present invention, however, can be applied to other robot controllers in which the posture of the finger portion is not controlled. In such a case, only errors in the position vector (x, y, z) are compensated for using a neural network. This reduces the complexity of the processing.

In the above-mentioned embodiment, temperature and load are taken into consideration, as the causes of errors, during the reverse conversion using the reverse conversion function fa. However, other causes of errors may be taken into consideration during the reverse conversion. On the contrary, even if none of the causes of errors are not taken into consideration, the errors can be compensated for by the neural network.

Second Embodiment:

A: Mechanical Structure of Robot

Figure 12:
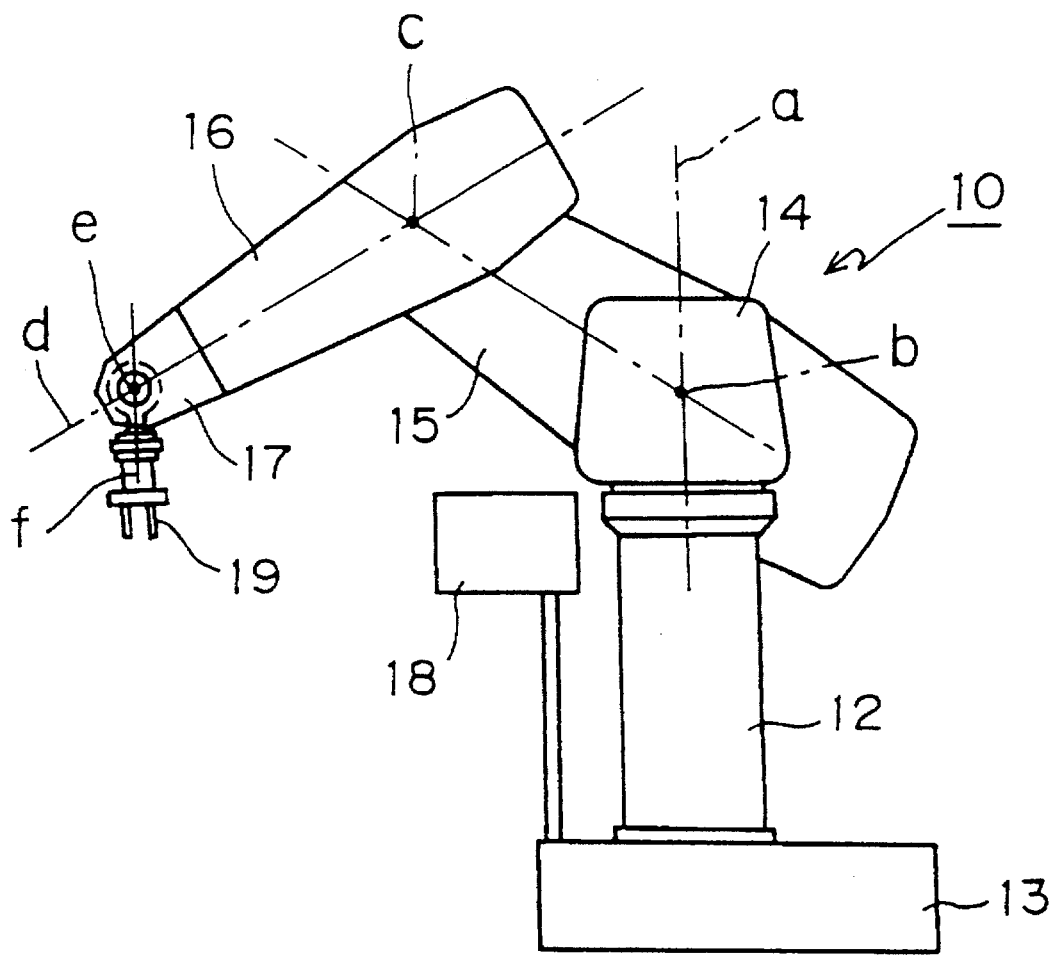
FIG. 12 is a view showing the structure of a robot used in a second embodiment of the present invention.
Figure 13:
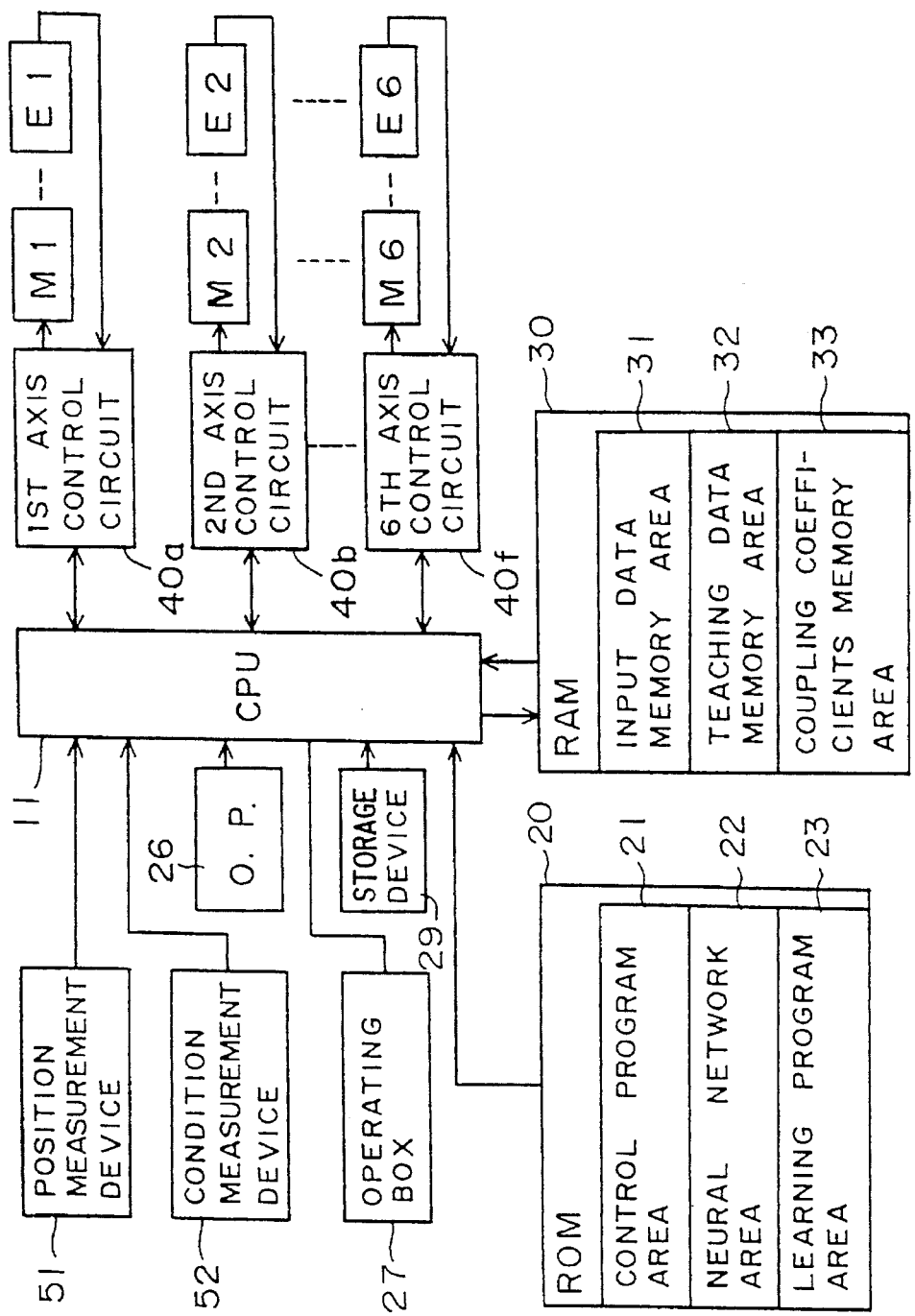
FIG. 13 is a block diagram showing the structure of a robot controller according to the second embodiment.

The mechanical structure of a robot 10 used in this embodiment is the same as that in the first embodiment excepting that the robot 10 is further provided with a three-dimensional position measuring device 18 for measuring the position of the finger portion of the robot 10 with laser beam, as shown in FIG. 12. The finger portion 19 is provided with a mirror (not shown) for reflecting the laser beam emitted from the three-dimensional position measuring device 18. The three-dimensional position measuring device 18 operates in response to a command signal output from a position measurement device 51 which win be explained hereinafter.

B: Structure of Robot Controller

The structure of a robot controller for controlling the robot 10 is also the same as that in the first embodiment. The controller, however, is provided with the position measurement device 51 for automatically measuring the position of the finger portion 19 of the robot 10, and a condition measurement device 52 for automatically measuring physical conditions which cause positioning error, such as temperature and load. The condition measurement device 52 activates the three-dimensional position measuring device 18 to detect the position of the finger portion 19. The measurement data output from the measuring device 18 is input to the CPU 11. The condition measurement device 52 predicts the load of each of the servomotor M1 through M6 based on the magnitude of the current flowing therethrough.

C: Neural Network

The structure and operation of a neural network used in this embodiment is the same as that of the neural network used in the first embodiment. Therefore, the detailed explanation of the neural network win be omitted.

D: Operation of Robot Controller

Figure 14:
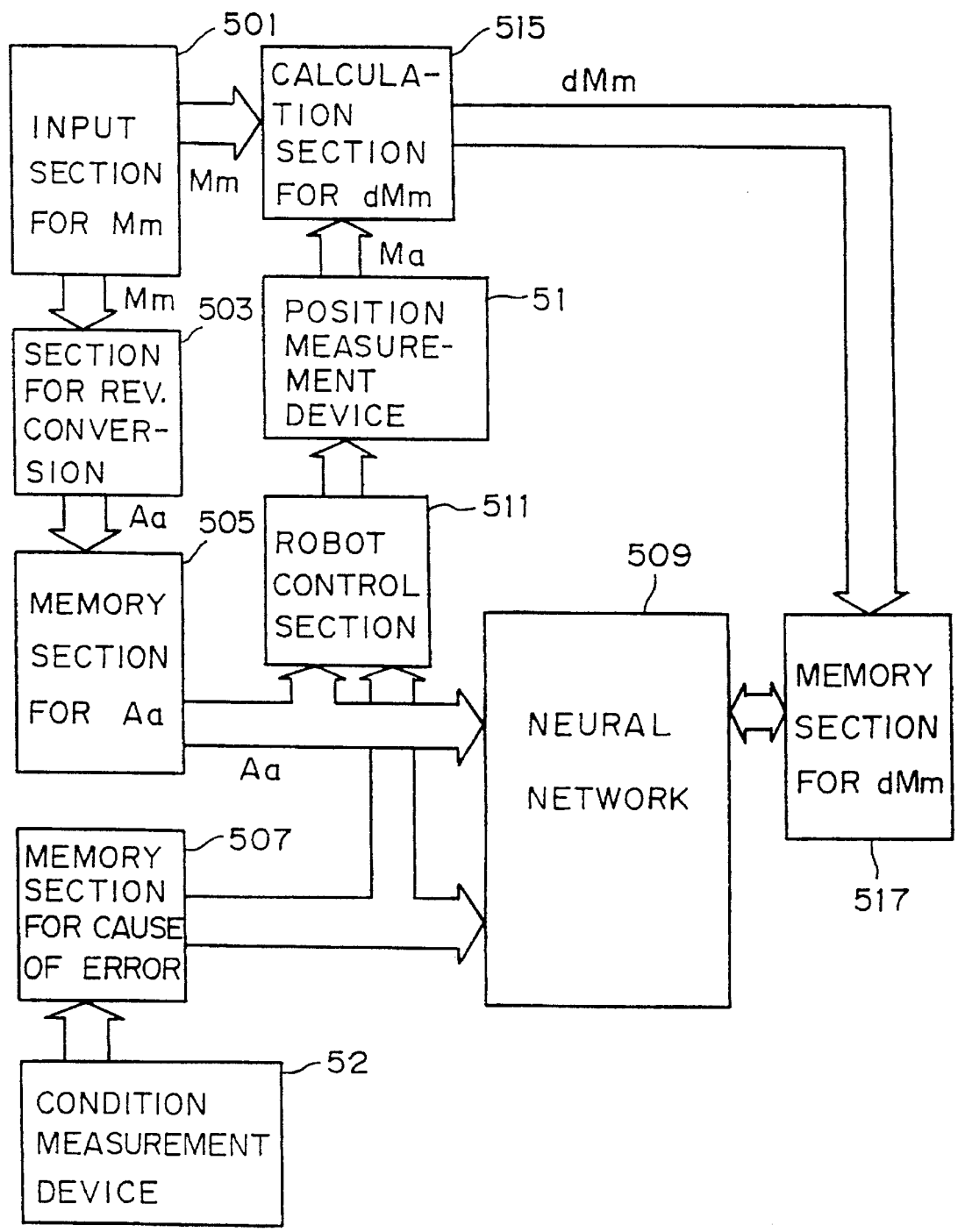
FIG. 14 is a block diagram showing the operation or the robot controller according to the second embodiment at the time or learning.

1. Learning Operation:

The learning procedure of the neural network win be explained with reference to the block diagram of FIG. 14 which roughly shows the operation of the CPU 11 and the flowcharts shown in FIG. 15(a) and FIG. 15(b).

Figure 15A:
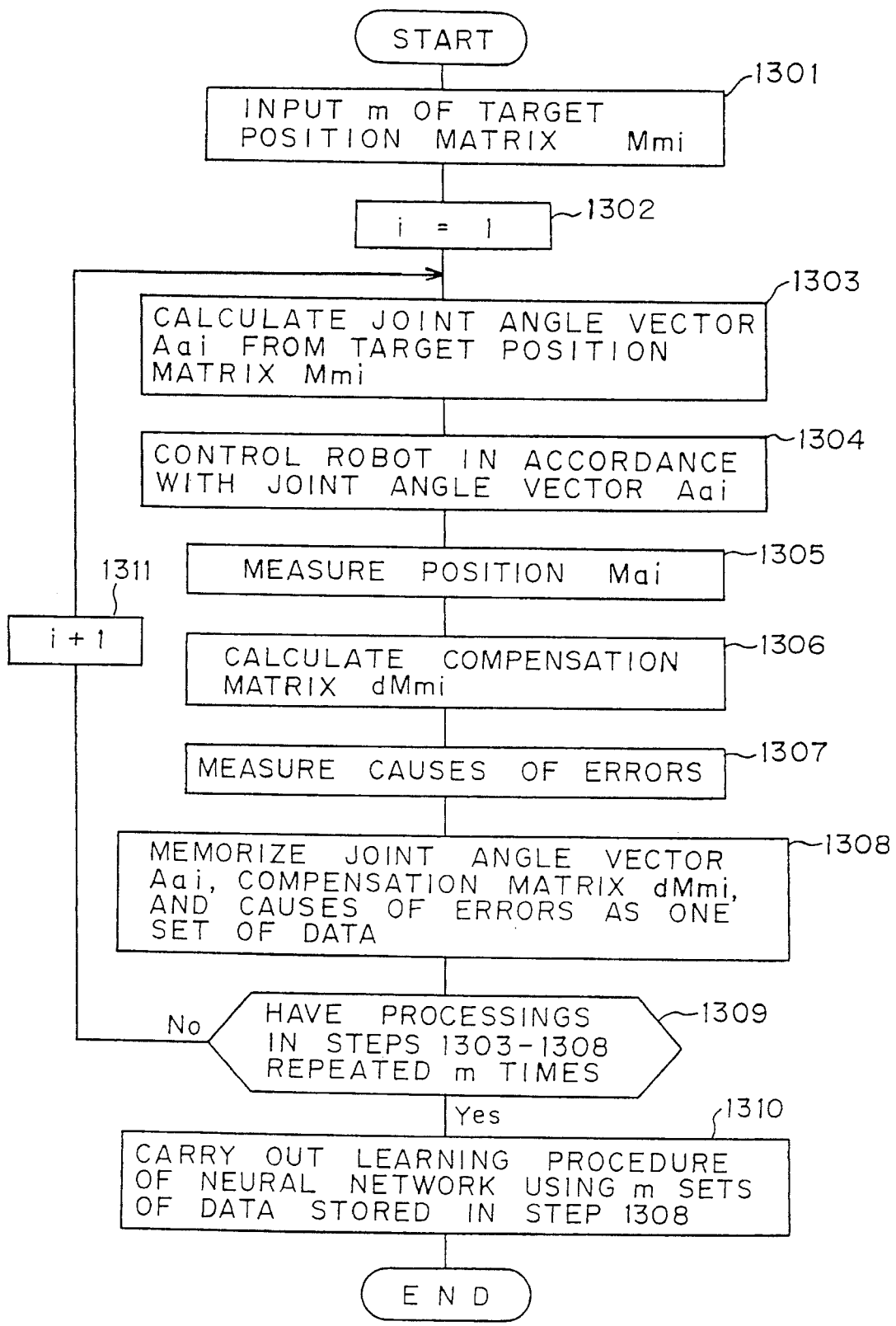
FIG. 15(a) is a flowchart showing the operation of the robot controller according to the second embodiment at the time of initial learning.
Figure 15B:
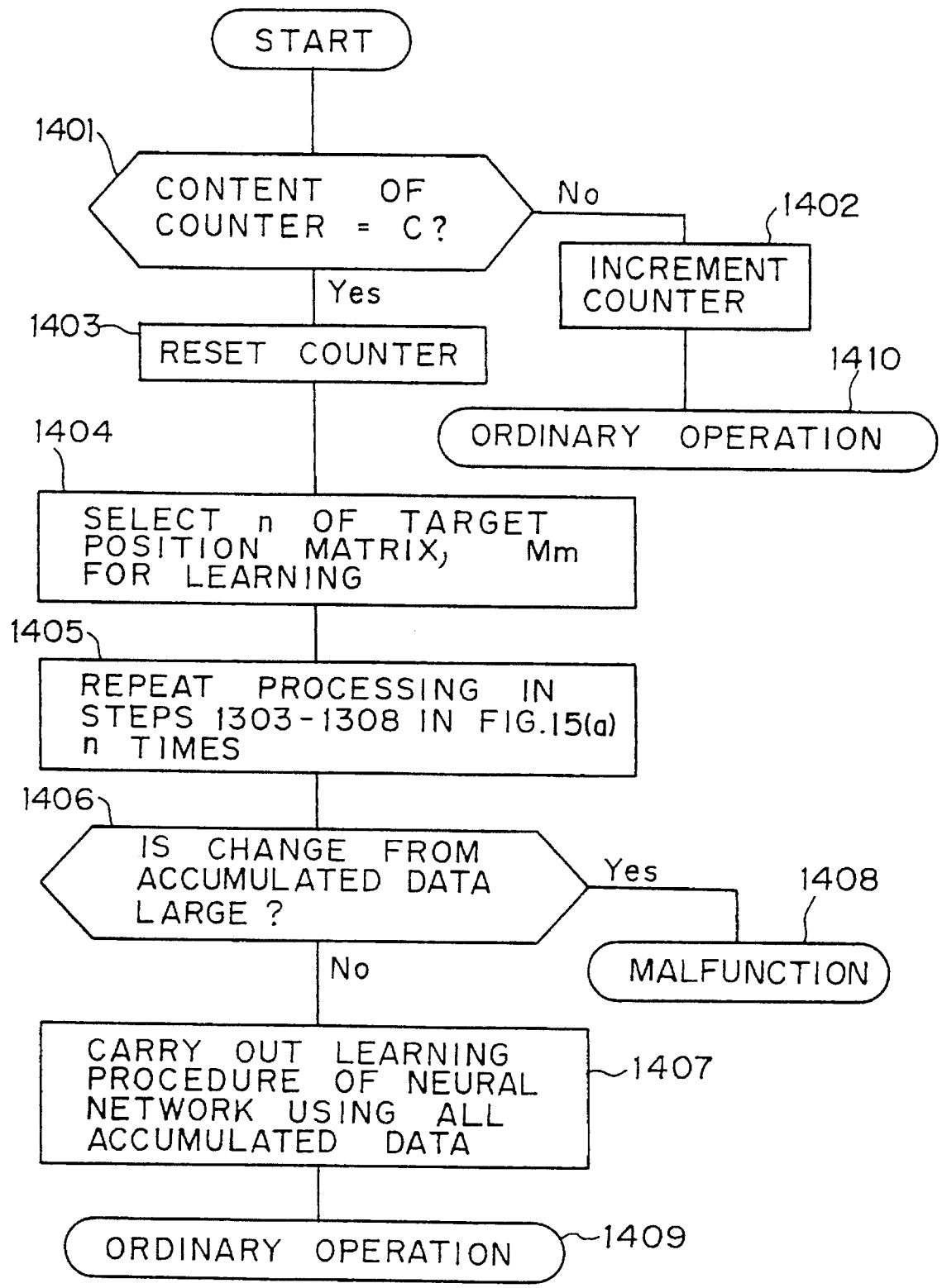
FIG. 15(b) is a flowchart showing the operation of the robot controller according to the second embodiment at the time of learning during operation of the robot.

In this embodiment, the processing shown by the flow chart of FIG. 15(a) is initially executed so as to carry out an initial learning of the neural network. Further, the processing shown by the flow chart of FIG. 15(b) is also executed at predetermined time intervals so as to repeatedly carry out the learning procedure of the neural network during the operation of the robot 10.

The initial learning procedure win be explained.

The CPU 11 reads out m pieces of target position matrixes Mm [Mm$_1$, Mm$_2$, . . . M$_m$] from the memory in step 1301, and makes an input section 501 store the target position matrixes. In step 1302, a first target position matrix Mm$_1$ is selected. In a calculation section 503, a joint angle vector Aa$_1$ corresponding to the target position matrix Mm$_1$ is calculated with the use of a reverse conversion function fa in which load and temperature are taken into account as the cause of errors (step 1303).

Next, a control section 511 drives the servomotors of the robot 10 in accordance with the joint angle vector $Aa_1$ (step 1304). After that, the CPU11 outputs a command signal to the position measurement device 51 to measure the position of the finger portion 19 of the robot (step 1305) in order to calculate a position matrix $Ma_1$ indicating the actual position of the finger portion 19 after the positioning operation. In a calculation section 515, a reverse matrix of the target position matrix $Mm_1$ is calculated, and a compensation matrix $dMm_1$ is then calculated by the formula (3) using the reverse matrix and the position matrix $Ma_1$ indicating the actual position of the finger portion 19 (step 1306). In addition to the measurement of the position of the finger portion 19, the CPU 11 activates the condition measurement device 52 in order to detects the temperature, load and the like which are the causes of errors (step 1307). In step 1308, the joint angle vector $Aa_1$ obtained in the calculation section 503 is stored in a memory section 505, the compensation matrix $dMm_1$ is stored in a memory section 517, and the data regarding the causes of errors (load, temperature and the like) is stored in a memory section 507. These data are treated as one set of data for the target position matrix $Mm_1$, and are used for learning procedure of the neural network.

Next, it is judged in step 1309 whether or not the above-mentioned data accumulation has been carried out for all of the m sets of target position matrixes, from $Mm_1$ though $Mm_m$. This judgment is made by checking whether the data number i reaches m. Since i is one at this time, the result of judgment in step 1309 becomes negative, and the processing moves to step 1311 at which the data number i is incremented by one. After that the processing moves back to step 1303 to accumulate data for a next target position matrix $Mm_2$. On the contrary, when it is judged in step 1309 that data have been accumulated for the m sets of target position matrixes, the processing moves to step 1310 in which the learning procedure of the neural network 509 is carried out in the same manner as that in the first embodiment, in which the joint angle vectors Aa $[Aa_1, Aa_2, \ldots Aa_m]$ and date regarding the causes of errors, both accumulated in step 1308, are used as input data, and compensation matrixes dMm $[dMm_1, dMm_2, \ldots dMm_m]$ are used as teaching data. The neural network 509 thereby learns the relationship between the joint angle vectors Aa and the compensation matrixes dMm Next, the learning procedure of the neural network which is carried out at predetermined intervals during the operation of the robot 10 win be explained with reference to FIG. 15(*b*).

Initially, the CPU 11 judges in step 1401 whether or not the number of operation cycles carried out by the robot 10 reaches a predetermined value C by checking the content of a counter which counts the number of operation cycles carried by the robot 10. When it is judged that the content of the counter has not reached the value C, the processing moves to step 1402, in which the counter is incremented by one. After that, ordinary operation cycle is started (step 1410).

On the other hand, when it is judged that the content of the counter has reached the value C, the processing moves to step 1403, in which the counter is cleared. After that, the following learning procedure is carried out. In detail, n pieces of target position matrixes Mm $[Mm_1, Mm_2, \ldots Mm_n]$ are selected from the target position matrixes stored in the memory, in step 1404, and are stored in the input section 501. After that, processing in steps 1303 to 1308 in FIG. 15(*a*) is repeated n times so as to accumulate joint angle vectors Aa $[Aa_1, Aa_2, \ldots Aa_n]$ corresponding to the target position matrixes Mm $[Mm_1, Mm_2, \ldots Mm_n]$, compensation matrixes dMm $[dMm_1, dMm_2, \ldots dMm_n]$, and date regarding the causes of errors (step 1405).

In next step 1406, the newly obtained compensation matrixes dMm $[dMm_1, dMm_2, \ldots dMm_n]$ are compared with the accumulated data, and it is judged whether or not the change amount of the compensation matrixes or difference between the newly obtained compensation matrixes and accumulated matrixes is larger than a predetermined amount. When it is judged at step 1406 that the change amount of the compensation matrixes is larger than the predetermined amount, the processing moves to step 1408 in which the occurrence of malfunction is informed to an operator. On the contrary, it is judged at step 1406 that the change amount of the compensation matrixes is relatively small and within a limit, the processing moves to step 1407, in which the learning procedure of the neural network 509 is carried out using new input data and new teaching data. The new input data include joint angle vectors Aa $[Aa_1, Aa_2, \ldots Aa_n]$ and data regarding the causes of errors, which have been accumulated in step 1405, as well as the previously accumulated input data. The new teaching data include the compensation matrixes dMm $[dMm_1, dMm_2, \ldots dMm_n]$, which have been accumulated in step 1405, as well as the previously accumulated teaching data. After that, ordinal operation has been started in step 1409.

2. Ordinary Operation:

Since the operation of the robot controller is the same as that of the robot controller in the first embodiment, the explanation thereof win be omitted.

Figure 16:
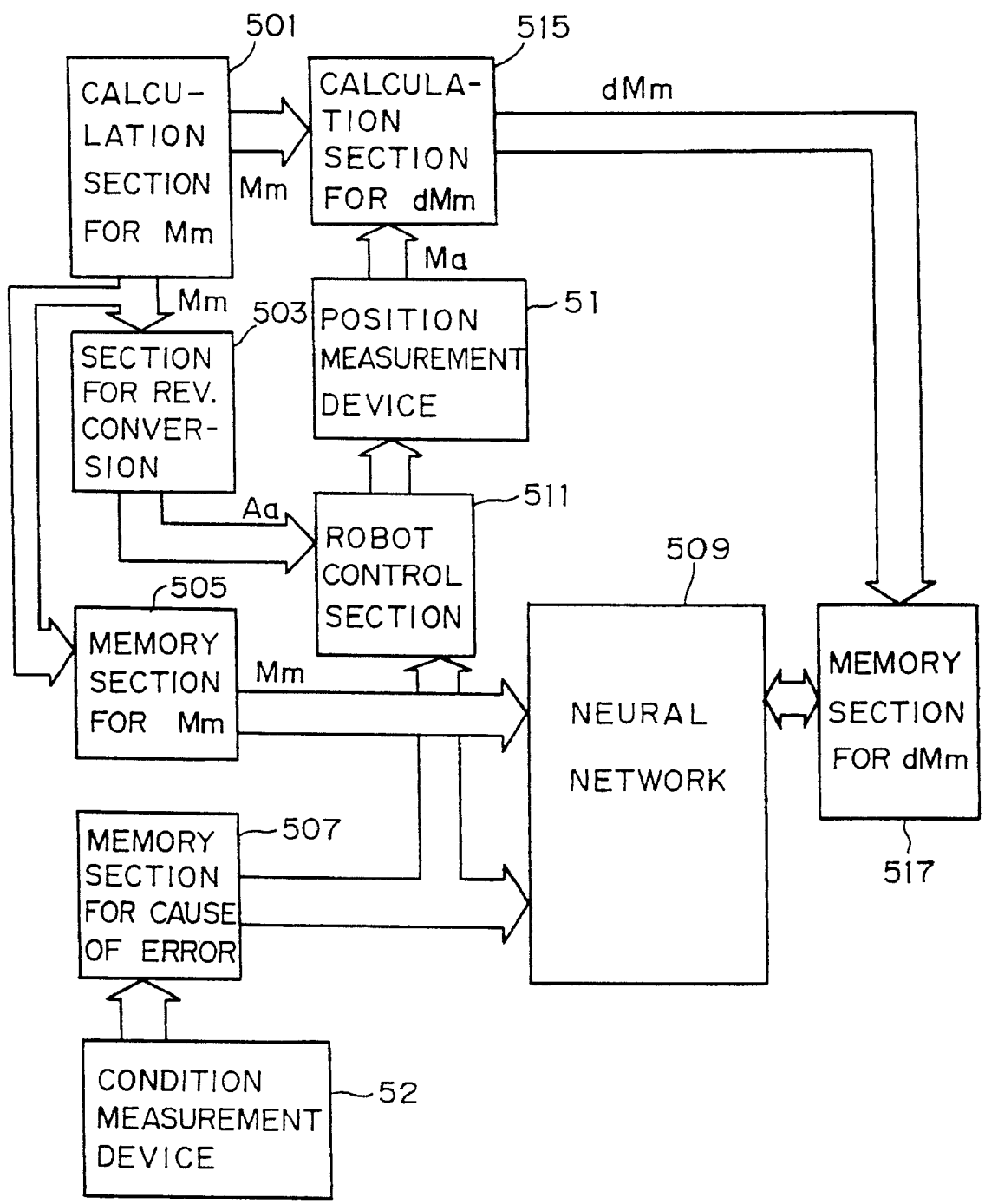
FIG. 16 is a block diagram showing the operation of the robot controller according to the modification of the second embodiment at the time of learning.
Figure 17:
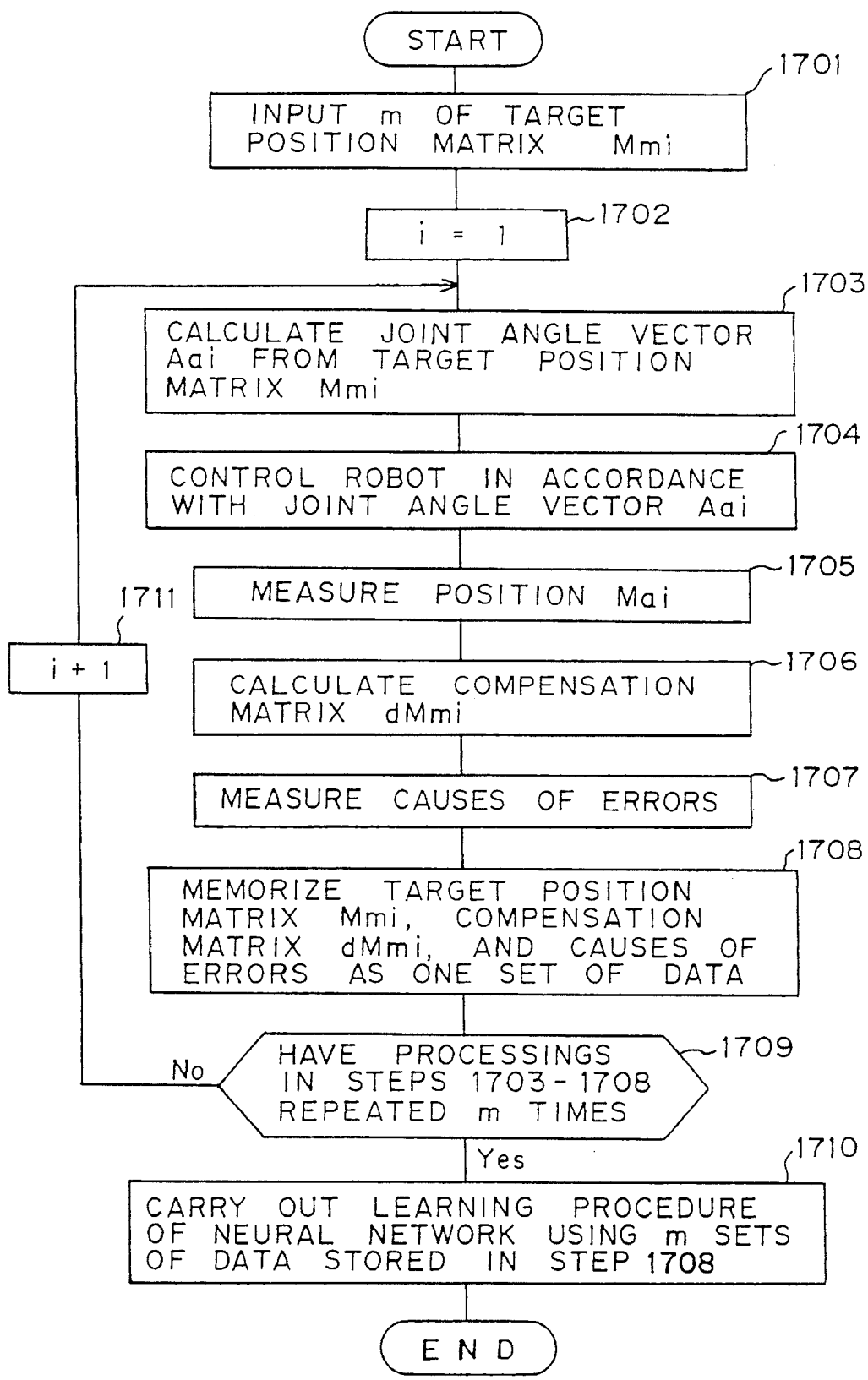
FIG. 17 is a flowchart showing the operation of the robot controller according to a modification of the second embodiment at the time of initial learning.
Figure 18:
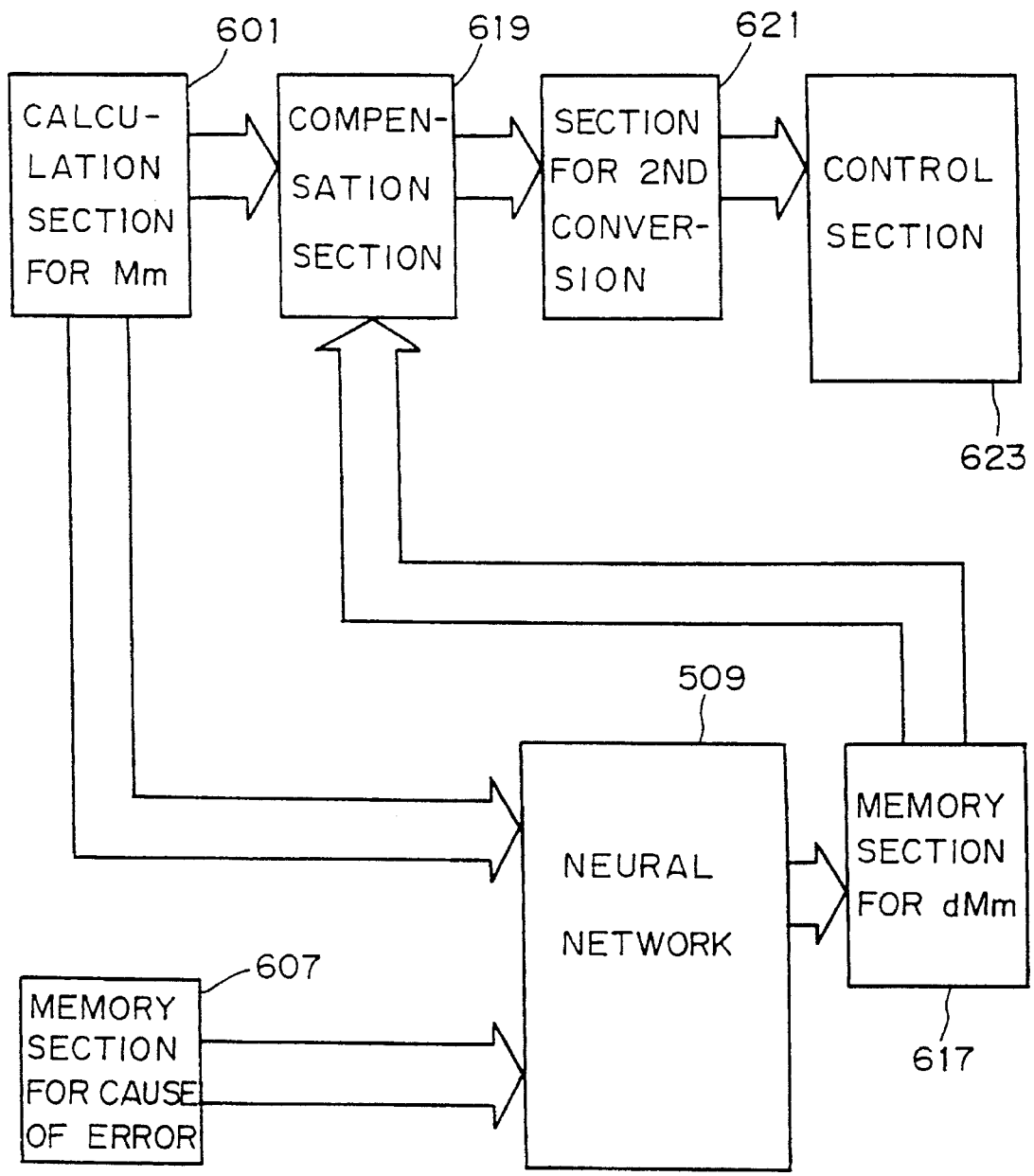
FIG. 18 is a block diagram showing the operation of the robot controller according to the modification of the second embodiment after learning.

FIG. 16 through FIG. 18 show a modification of this embodiment. FIG. 16 is a block diagram showing operation of the robot controller in accordance with the modification at the time of learning, which corresponds to FIG. 14 in the second embodiment. In this modification, target position matrixes Mm, instead of the joint angle vectors As are used as the input data. Namely, the target position matrixes Mm output from the input section 501 are stored in the memory section 505' and are then given to the neural network 509.

The detailed operation win be explained with reference to the flowchart shown in FIG. 17.

Initially, the CPU 11 reads out m pieces of target position matrixes Mm $[Mm_1, Mm_2, \ldots M_m]$ from the memory in step 1701. In step 1702, first target position matrix $Mm_1$ is selected. In step 1703, a joint angle vector $Aa_1$ corresponding to the target position matrix $Mm_1$ is calculated with the use of a reverse conversion function fa in which load and temperature are taken into account as the cause of errors.

Next, the robot 10 is operated in accordance with the joint angle vector $Aa_1$ (step 1704). After that, the CPU11 outputs a command signal to the position measurement device 51 to measure the actual position of the finger portion 19 (step 1705) in order to calculate a position matrix $Ma_1$ indicating the actual position of the finger portion 19 after the positioning operation. In step 1706, a reverse matrix of the target position matrix $Mm_1$ is calculated, and a compensation matrix $dMm_1$ is then calculated by the formula (3) using the reverse matrix and the position matrix $Ma_1$ indicating the actual position of the finger portion 19. In addition to the measurement of the position of the finger portion 19, the CPU 11 activates the condition measurement device 52 in order to detects the temperature, load and the like which are the causes of errors (step 1707). In step 1708, the target position matrix Mm1, the compensation matrix $dMm_1$, and the data regarding the causes of errors (load, temperature and the like) are stored as one set of data for the target position matrix $Mm_i$.

Next, it is judged at step 1709 whether or not the above-mentioned data accumulation has been carried out for all of the m sets of target position matrixes, from $Mm_1$ though $Mm_m$. When it is judged that data have not been accumulated for the m sets of target position matrixes, the processing moves back to step 1703 to accumulate data for a next target position matrix $Mm_i$. On the contrary, when it is judged in step 1709 that data have been accumulated for the m sets of target position matrixes, the processing moves to step 1710 in which the learning procedure of the neural network 509 is carried out in the same manner as that in the above-mentioned embodiment, in which the target position matrixes Mm [$Mm_1$, $Mm_2$, ... $Mm_m$] and date regarding the causes of errors are used as input data, and compensation matrixes dMm [$dMm_1$, $dMm_2$, ... $dMm_m$] are used as teaching data. The neural network 509 thereby learns the relationship between the target position matrixes Mm and the compensation matrixes dMm.

In this modification, the learning procedure or the neural network which is also carried out during the operation of the robot 10. In this modification, the length of time during which the robot 10 is operated is accumulated, and the learning procedure is carried out whenever the length of time reaches a predetermined value. Since other parts or the operation is the same as that in the above-embodiment, the detailed explanation will be omitted. The learning procedure may be carried out at predetermined time intervals at which an accuracy checking cycle is executed for checking the positioning accuracy of the robot 10.

FIG. 18 is a block diagram showing operation or the robot controller in accordance with the modification after the learning procedure.

In this modification, a target portion matrix Mm calculated in the calculation section 601 is directly input to the neural network 509 so as to obtain a compensation matrix dMm.

In the above-mentioned modification, target position matrix Mm is input to the neural network so as to obtain a compensation matrix dMm. However, the neural network may be used in different manners. In one manner, a target position matrix Mm is input to the neural network to obtain a compensated joint angle vector Aa' corresponding to a compensated target position matrix Mm'. In such case, learning procedure of the neural network is carried out using plural target position matrixes Mm as input data and plural compensated joint angle vector Aa' as teaching data. In another manner, a joint angle vector Aa is input to the neural network to obtain a compensated joint angle vector Aa' corresponding to a compensated target position matrix Mm'. In such case, learning procedure of the neural network is carried out using plural joint angle vectors Aa as input data and plural compensated joint angle vector Aa' as teaching data.

In the second embodiment and its modification, the production of a positioning error is measured during the re-learning procedure of the neural network during the operation of the robot, and the occurrence of malfunction is informed to the operator when the position error is larger than a predetermined value. Therefore, when a malfunction of the robot 10 occurs, the occurrence of the malfunction can be detected immediately.

Third Embodiment:
A: Mechanical Structure of Robot

Since the mechanical structure of a robot 10 is the same as that of the robot 10 in the first embodiment, the explanation thereof win be omitted.

B: Structure of Robot Controller

A robot controller 2050 of the present embodiment has the same structure as that of the robot controller in the first embodiment. However, in this embodiment, an off-line teaching apparatus 2060 is further provided in addition to the robot controller 2050, as shown in FIG. 19.

Figure 19:
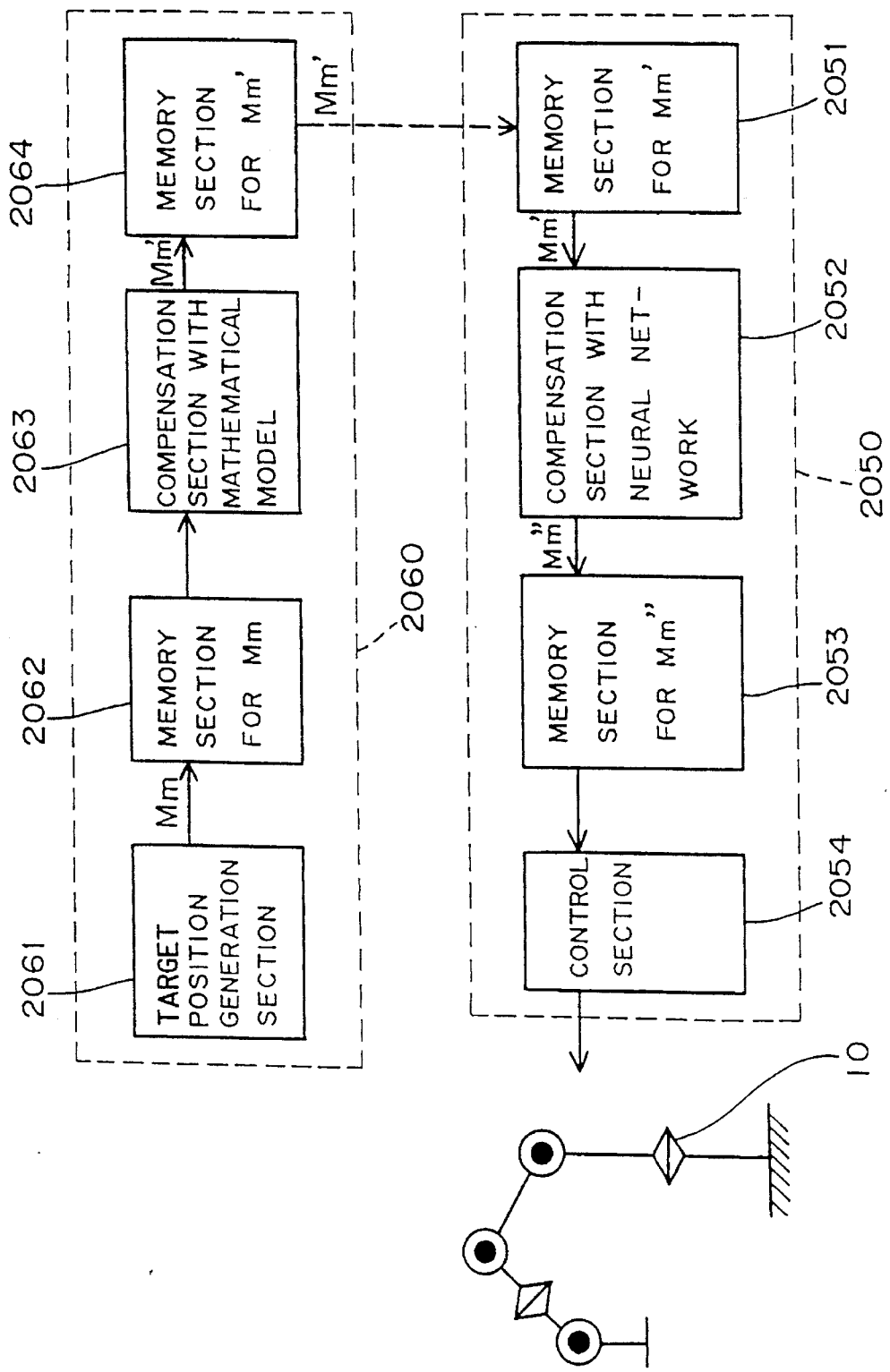
FIG. 19 is a block diagram showing the functional structure of a teaching apparatus and a robot controller according to a third embodiment of the present invention.

FIG. 19 is a functional block diagram which shows functional units or sections of the robot controller 2050 and the off-line teaching apparatus 2060. Each of these functional sections is realized by hardware and software.

Figure 3:
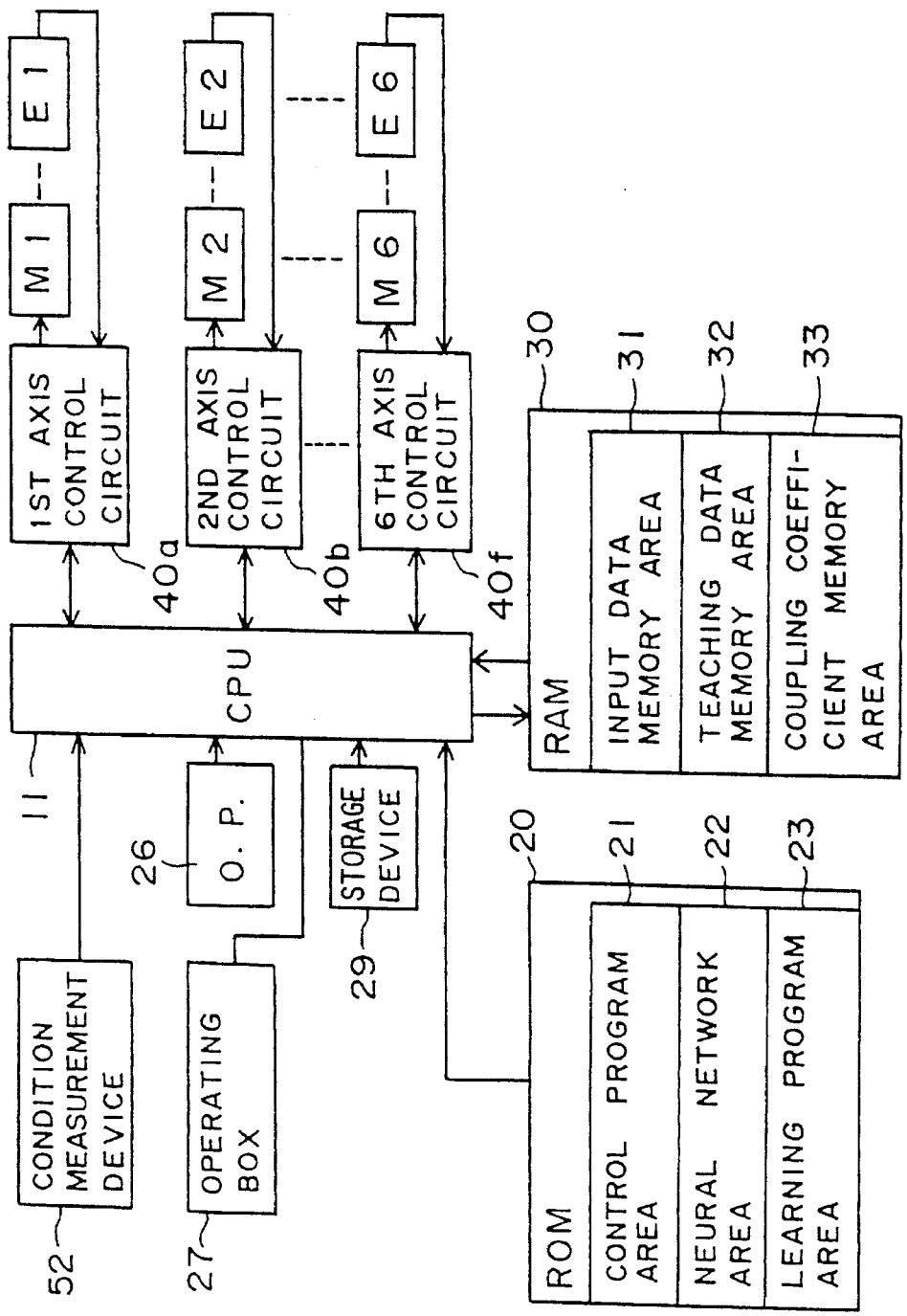
FIG. 3 is a block diagram showing the structure of a robot controller according to the fist embodiment.

The off-line teaching apparatus 2060 comprises a computer which is composed of a CPU, a memory, a CRT, a keyboard and the like. The hardware structure of the robot controller 2050 is the same as that of the robot controller of the first embodiment, which is shown in FIG. 3.

The operation of the present embodiment win be explained with reference to FIG. 19.

In a target position generation section 2061 of the off-line teaching apparatus 2060, target position matrixes Mm indicating target positions of the robot 10 are generated. The generated position matrixes Mm are then stored in a memory section 2062. In a compensation section 2063, compensated target position matrixes Mm' are obtained by compensating the target position matrixes Mm using a mathematical model, in which the length of each arm of the robot 10, angular errors produced during the assembly of the robot 10 and the like are taken into consideration. In a memory section 2064, the compensated target position matrixes Mm are written into a floppy disk or the like as control data.

An operator takes the floppy out of the memory section 2064, and inserts the floppy disk into a floppy drive of the robot controller 2050. The memory section 2051 reads out the compensated target position matrixes Mm' from the floppy disk successively. The target position matrixes Mm' are compensated in a compensation section 2052 in accordance with the output of the neural network to obtain target position matrixes Mm" which have been further compensated. The target position matrixes Mm" are stored in a memory section 2053. A control section 2054 reads out the stored target position matrixes Mm" so as to control the robot 10.

The operations of the robot controller 2050 during learning and after learning are similar to those in the first embodiment, the detailed explanation will be omitted.

In the above-mentioned embodiment and its modification, the control data for controlling the robot 10 is transferred from the off-line teaching apparatus 2060 to the robot controller 2050 by means of a floppy. However, the transfer of the control data may be carried out through a data transmitting line which is disposed between the off-line teaching apparatus 2060 and the robot controller 2050.

As described above, the target position matrixes are compensated twice by the use of a mathematical model and a neural network. Therefore, the compensation can be carried out accurately. The high accuracy eliminates the necessity of compensation of teaching data, which is conventionally carried out at a working cite at which the robot is actually used. This shortens the length of time required to install the robot. Further, this improves the safety of the robot 10, because it becomes possible to prevent the robot from moving to undesired positions differing from the teaching points.

Fourth Embodiment:
A: Mechanical Structure of Robot

Since the mechanical structure of a robot 10 is the same as that of the robot 10 in the first embodiment, the explanation thereof win be omitted.

B: Structure of Robot Controller

Figure 20:
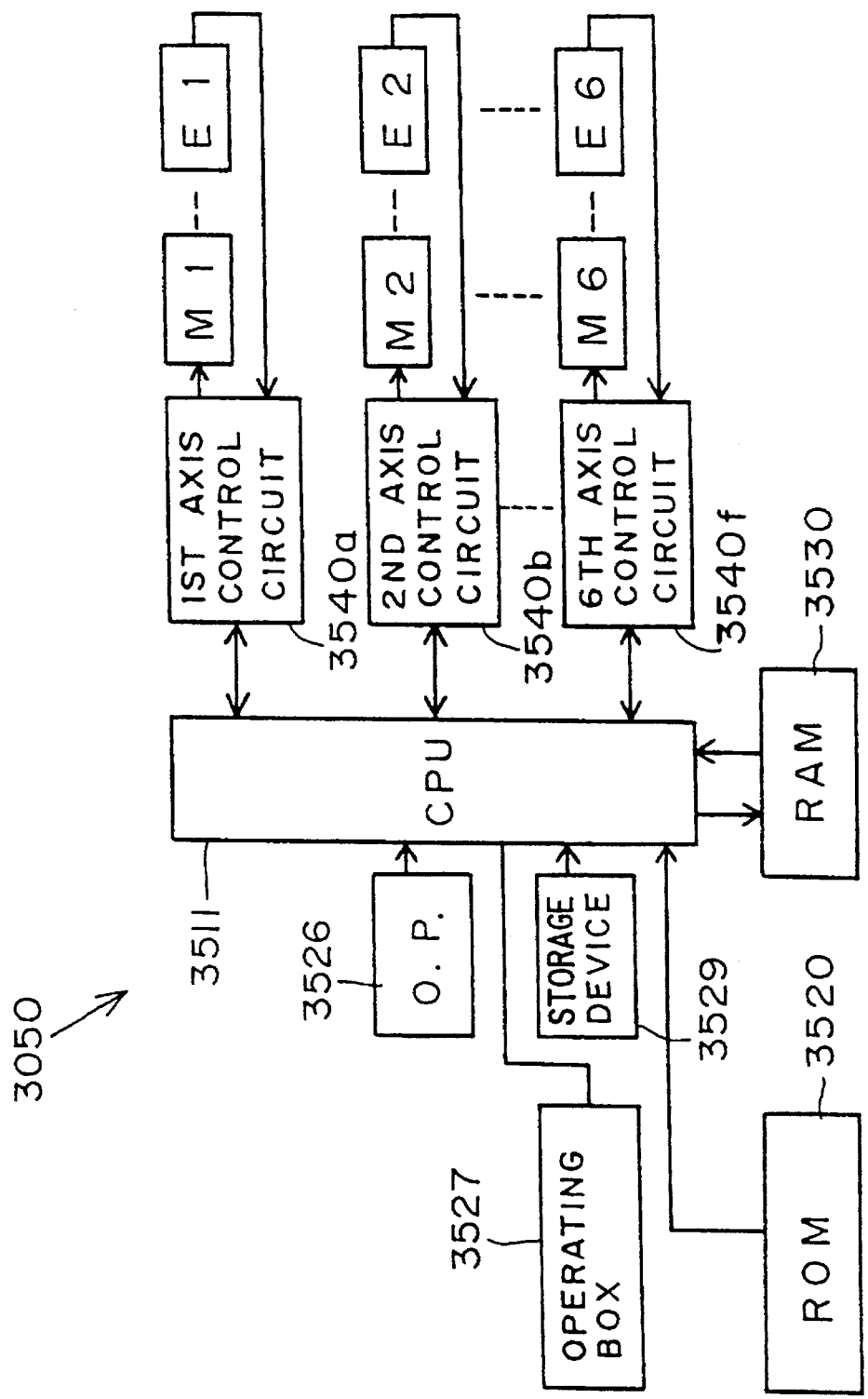
FIG. 20 is a block diagram showing the structure of a robot controller according to the fourth embodiment.
Figure 21:
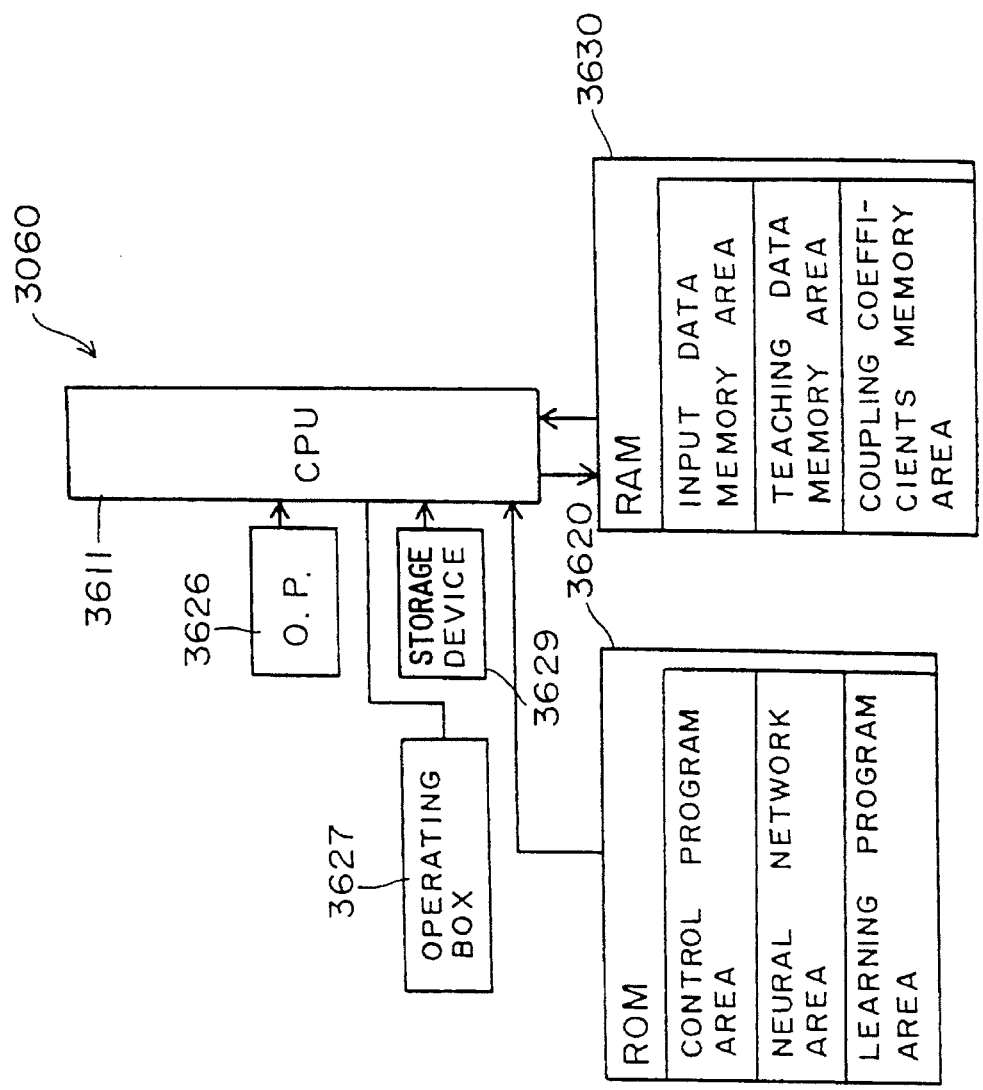
FIG. 21 is a block diagram showing the structure of a teaching apparatus according to a fourth embodiment of the present invention.

The structure of a robot controller 3050 and the structure of an off-line teaching apparatus 3060 are shown in FIGS. 20 and 21, respectively.

The robot controller 3050 is composed of a CPU 3511, an operating box 3527 and an operation panel 3526, an external storage device 3529 such as a floppy disc drive, a ROM 3520, and a RAM 3530. Six servo control circuits 3540*a* through 3540*f* are connected to the CPU 3511. The off-line teaching apparatus 3060 is composed of a CPU 3611, an operating box 3627 and an operation panel 3626, an external storage device 3629 such as a floppy disc drive, a ROM 3620, and a RAM 3630.

Figure 22:
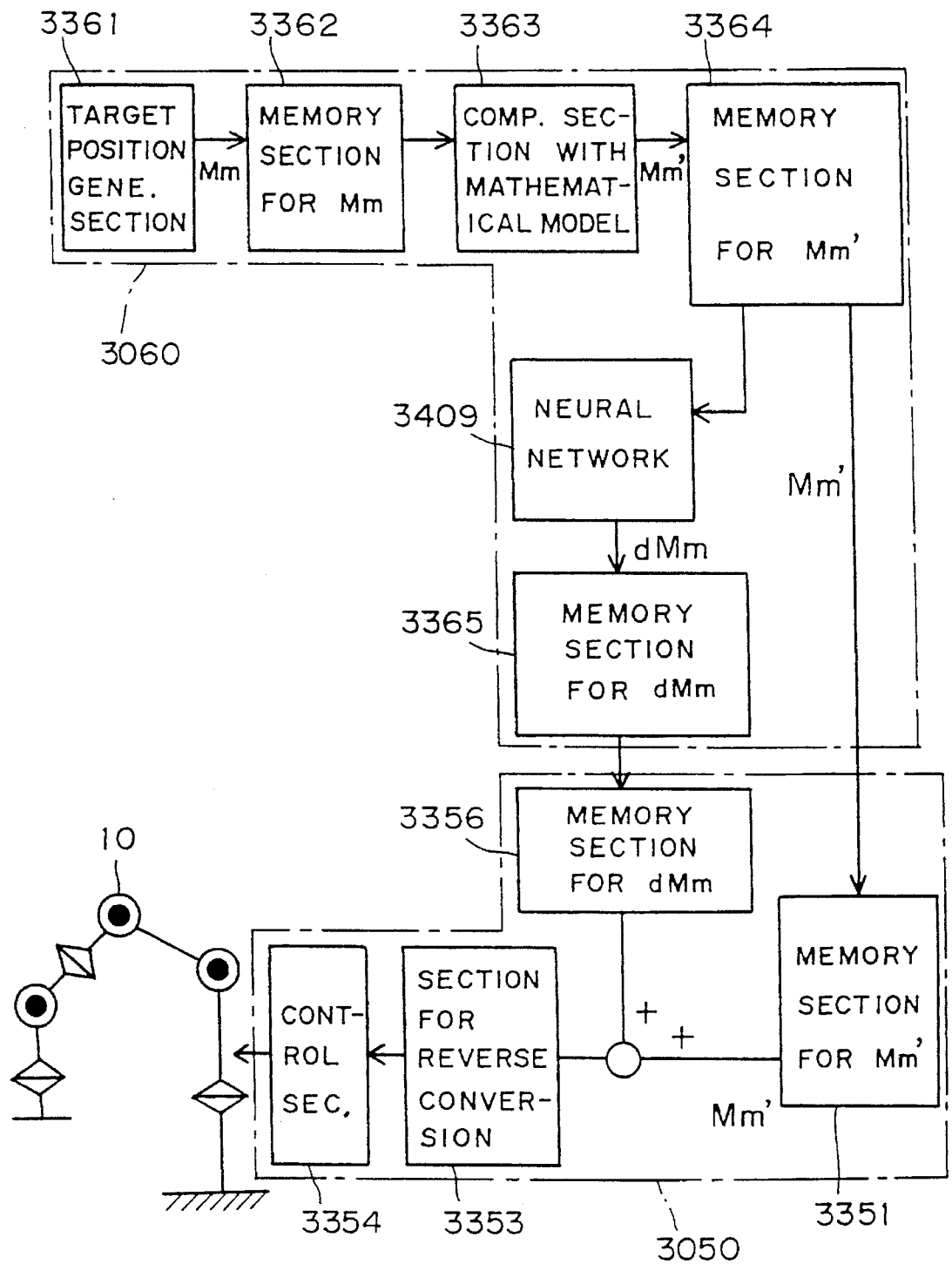
FIG. 22 is a block diagram showing the functional structure of the teaching apparatus and the robot controller according to the fourth embodiment of the present invention.

FIG. 22 is a functional block diagram which shows functional units or sections of the robot controller 3050 and the off-line teaching apparatus 3060. Each of these functional sections is realized by hardware and software.

The operation of the present embodiment win be explained with reference to FIG. 22.

In a target position generating section 3361 of the off-line teaching apparatus 3360, target position matrixes Mm indicating target positions of the robot 10 are generated. The generated position matrixes Mm are then stored in a memory section 3362. In a compensation section 363, compensated target position matrixes Mm' are obtained by compensating the target position matrixes Mm using a mathematical model, in which the length of each arm of the robot 10, angular errors produced during the assembly of the robot 10 and the like are taken into consideration. In a memory section 3364, the compensated target position matrixes Mm' are written into a floppy disk or the like as control data. The target position matrixes Mm' stored in the memory section 3364 are given to the neural network 3409 to obtain compensation matrixes dMm. In memory section 3365, the compensation matrixes dMm are also stored in the floppy disk as error compensation information. As a result, both of the compensated target position matrixes Mm' and the compensation matrixes dMm are stored in the floppy disk.

An operator then takes the floppy out of the off-line teaching apparatus 3060, and inserts the floppy disk into a floppy drive of the robot controller 3050. The memory section 3351 reads out the compensated target position matrixes Mm' from the floppy disk successively, while the memory section 3356 reads out the compensated target position matrixes Mm' front the floppy disk successively. The target position matrixes Mm' are added with the compensation matrixes dMm, which are output of the neural network, to obtain target position matrixes Mm" which have been further compensated. In calculation section 3353, the target position matrixes Mm" are reversely converted using the reverse conversion function fa to obtain joint angle vectors Aa. A control section 3354 controls the robot 10 in accordance with the joint angle vectors Aa.

Figure 23:
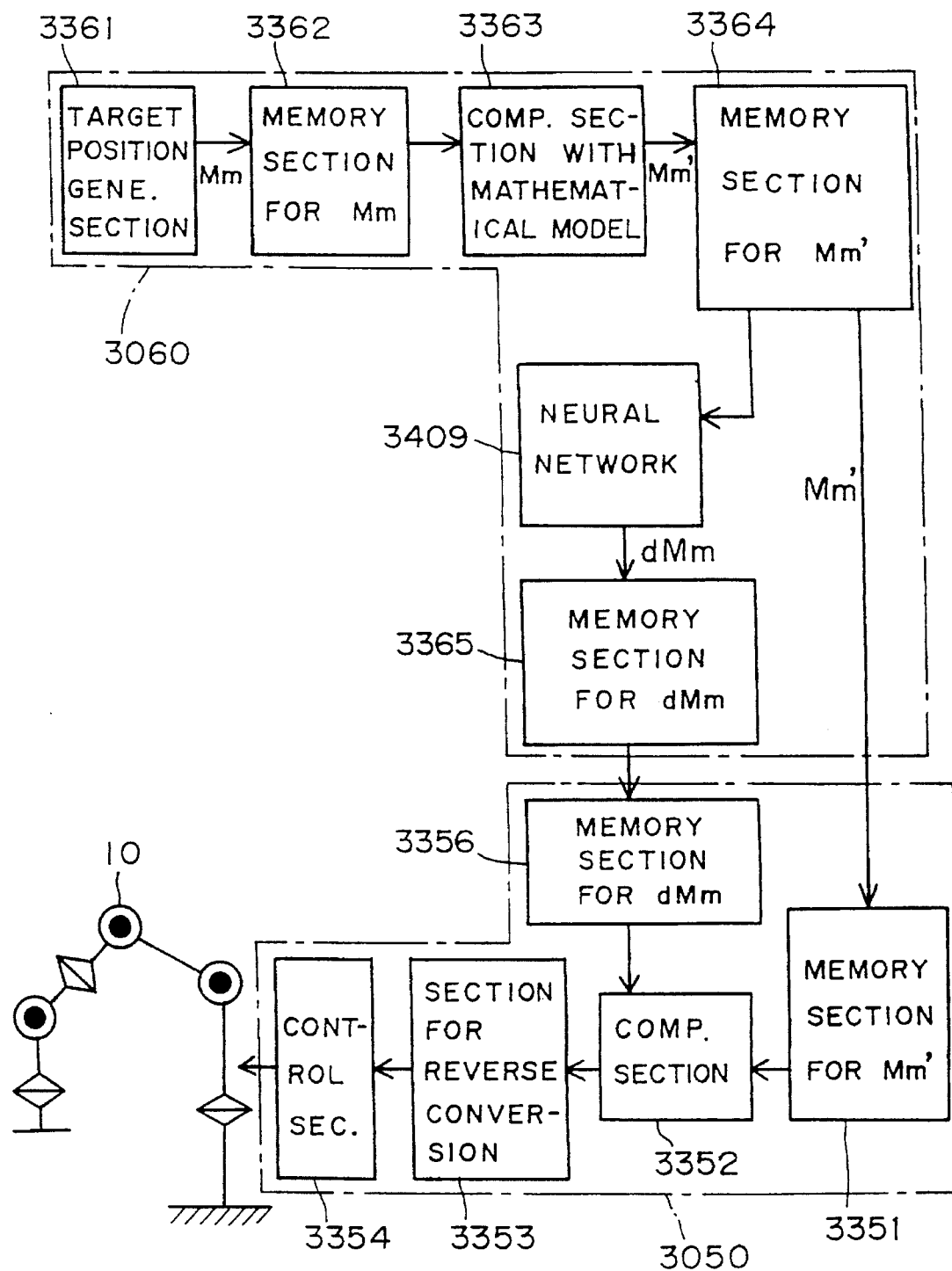
FIG. 23 is a block diagram showing the functional structure of the teaching apparatus and the robot controller according to a modification of the fourth embodiment of the present invention.

FIG. 23 is a block diagram showing a modification of the present embodiment. In the above-mentioned fourth embodiment, the compensation matrixes dMm are determined such that, when the compensation matrixes dMm are added to the target position matrixes Mm', position matrixes Ma indicating actual destination positions coincide with the target position matrixes Min. In this modification, the compensation matrixes dMm are determined such that, when the target position matrixes Mm' is multiplied by the reverse matrix $Mm^{-1}$ of the compensation matrix dMm', position matrixes Ma indicating actual destination positions coincide with the target position matrixes Mm.

When the amount of error occurring due to errors which are not taken into consideration in the mathematical model is defined as dMm', the relation between a compensated target position matrix Mm' and a position matrix Ma indicating the actual position of the finger portion 19 of the robot 10 which has been moved in accordance with the target position matrix Mm' is expressed as follows:

$$Mm' \cdot dMm' = Ma \qquad (2')$$

From the formula (2'), a compensation matrix dMm' indicating the amounts of errors to be compensated are calculated as follows:

$$dMm' = Mm'^{-1} \cdot Ma \qquad (3+)$$

Here, the reverse matrix $dMm'^{-1}$ of the compensation matrix dMm' is considered as a compensation amount. Ill the present embodiment, a target position matrix Mm" is obtained by multiplying the target position matrix Mm', which has been compensated in the off-line teaching apparatus 3060, by the reverse matrix $dMm'^{-1}$. The robot 10 is controlled in accordance with the target position matrix Mm". The compensation matrix dMm' is obtained in the off-line teaching apparatus 3060 as an output of the neural network 3409. The calculation of the reverse matrix $dMm'^{-1}$ of the compensation matrix dMm, and the multiplication between the reverse matrix $dMm'^{-1}$ and the target position matrix Mm' are carried out in the robot controller 3050.

In a target position matrix generation section 3361 of the off-line teaching apparatus 3060, target position matrixes Mm indicating target positions are generated. The generated target position matrixes Mm are stored in a memory section 3362. In a compensation section 3362, the target position matrixes Mm are compensated using the mathematical model so as to obtain the compensated target position matrixes Mm'. Next, the target position matrixes Mm' memorized in a memory section 3364 are input to the neural network 3409 to obtain the compensation matrixes dMm'. The learning procedure of the neural network has previously been carried out to output compensation matrixes dMm' corresponding to inputted target position matrixes Mm'. The data thus obtained are transferred to the robot controller 3050.

In a compensation section 3352 of the robot controller 3050, compensated target position matrixes dMm" are calculated based upon the target position matrixes Mm' held in the memory section 3351 and the compensation matrixes dMm' held in the memory section 3356. Namely, the reverse matrixes $dMm'^{-1}$ of the compensation matrixes dMm' are obtained, and the target position matrixes Mm' are multiplied by the reverse matrixes $dMm'^{-1}$ so as to obtain the compensated target position matrixes dMm".

In the fourth embodiment and its modification, the learning procedure of the neural network is carried out in the off-line teaching apparatus, whose CPU generally has a higher calculation capability compared to the CPU of the robot controller. Therefore, sophisticated leaning procedure can be carried out quicker compared to the case which the learning procedure is carried out in the robot controller.

Although the neural network in the above-mentioned embodiments has a three-layer structure composed of the input layer LI, intermediate layer LM and output layer OL, other types of neural networks having different structures may used as far as they can achieve the object of the present invention. In the above-mentioned embodiment, the manner of compensation is explained using mathematical formulae. The present invention, however, is not limited by the formulae.

Obviously, numerous modifications and variations of the present invention are possible in light of the above teachings. It is therefore to be understood that within the scope of the appended claims, the present invention may be practiced otherwise than as specifically described herein.

What is claimed is:

1. A method of controlling an articulated robot, comprising of the steps of:

calculating a first joint angle vector indicating target joint angles of respective joints of the robot based on a target position matrix indicating a desired target position;

supplying a neural network with said first joint angle vector so as to obtain a compensation amount corresponding to said target position matrix;

multiplying said target position matrix with said compensation amount so as to obtain a compensated target position matrix;

calculating a second joint angle vector indicating target joint angles of the respective joints of the robot based on said compensated target position matrix; and controlling the robot in accordance with the second joint angle vector.

2. An apparatus for controlling an articulated robot, comprising:

first calculation means for calculating a first joint angle vector indicating target joint angles of respective joints of the robot based on a target position matrix indicating a target position of an end effecter of the robot;

a neural network receiving the joint angle vector so as to obtain a compensation amount for compensating the target position matrix;

multiplying means for multiplying the target position matrix with said compensation amount so as to obtain a compensated target position matrix;

second calculation means for calculating a second joint angle vector indicating target joint angles of the respective joints of the robot based on said compensated target position matrix; and control means for controlling the robot in accordance with the second joint angle vector calculated by said second calculation means.

3. An apparatus for controlling an articulated robot according to claim 2, wherein said neural network is of a three layer type which is composed of an input layer, an intermediate layer and an output layer.

4. An apparatus for controlling an articulated robot according to claim 2, further comprising:

actual position measurement means for measuring the actual position of the end effecter of the robot;

third calculation means for calculating all ideal compensation amount based on a difference between the target position and the actual position;

means for carrying out a learning procedure of said neural network, in which the first joint angle vector calculated by said first calculation means and data regarding causes of errors are used as input data, and said ideal compensation amount is used as teaching data.

5. An apparatus for controlling an articulated robot according to claim 2, wherein said causes of errors are temperature of the robot and load acting thereon.

6. A method of controlling a robot, comprising the steps of:

(a) providing a neural network for receiving input data and for outputting a compensation amount which is used for compensating a target position of an end effector of the robot;

(b) calculating a control target value corresponding to the target position;

(c) controlling the robot in accordance with the control target value;

(d) measuring the position of the end effector of the robot after the end effector is moved;

(e) calculating an ideal compensation amount based on the target position and the measured position of the end effector;

(f) inputting into the neural network said target position or said control target value for carrying out a learning procedure of said neural network in which said target position or said control target value is used as the input data, and said ideal compensation amount is used as teaching data; and (g) repeating the steps (b)–(f) at predetermined time intervals after an operation of the robot has been started.

* * * * *

UNITED STATES PATENT AND TRADEMARK OFFICE
CERTIFICATE OF CORRECTION

PATENT NO. : 5,555,347
DATED : September 10, 1996
INVENTOR(S) : Takao YONEDA, et al.

It is certified that error appears in the above-indentified patent and that said Letters Patent is hereby corrected as shown below:

On the title page, in Item [75], the second inventor's name should read:

-- [75] Katsuhiro Komuro. --

Signed and Sealed this

Twenty-fourth Day of December, 1996

Attest:

BRUCE LEHMAN

*Attesting Officer*  *Commissioner of Patents and Trademarks*